(12) United States Patent
Yamashita et al.

(10) Patent No.: US 8,017,852 B2
(45) Date of Patent: Sep. 13, 2011

(54) MUSIC CONTENT REPRODUCTION APPARATUS, METHOD THEREOF AND RECORDING APPARATUS

(75) Inventors: Kosei Yamashita, Kanagawa (JP); Yasushi Miyajima, Kanagawa (JP); Motoyuki Takai, Tokyo (JP); Yoichiro Sako, Tokyo (JP); Toshiro Terauchi, Tokyo (JP); Toru Sasaki, Tokyo (JP); Yuichi Sakai, Kanagawa (JP)

(73) Assignee: Sony Corporation, Tokyo (JP)

( * ) Notice: Subject to any disclaimer, the term of this patent is extended or adjusted under 35 U.S.C. 154(b) by 1407 days.

(21) Appl. No.: 11/280,678

(22) Filed: Nov. 16, 2005

(65) Prior Publication Data

US 2006/0126452 A1    Jun. 15, 2006

(30) Foreign Application Priority Data

Nov. 16, 2004   (JP) ................. 2004-331583

(51) Int. Cl.
*G10H 1/00* (2006.01)
*G10H 1/18* (2006.01)

(52) U.S. Cl. ............... 84/615; 84/600; 84/601; 84/602; 84/610; 84/618; 84/626; 84/634

(58) Field of Classification Search .................. None
See application file for complete search history.

(56) References Cited

U.S. PATENT DOCUMENTS

| | | | |
|---|---|---|---|
| 4,926,737 A | 5/1990 | Minamitaka | |
| 7,022,905 B1 * | 4/2006 | Hinman et al. | 84/609 |
| 7,507,898 B2 * | 3/2009 | Horii et al. | 84/609 |
| 7,629,529 B2 * | 12/2009 | Makino | 84/615 |
| 2002/0041692 A1 | 4/2002 | Seto et al. | |
| 2005/0126370 A1 * | 6/2005 | Takai et al. | 84/636 |
| 2006/0126452 A1 * | 6/2006 | Yamashita et al. | 369/30.23 |
| 2007/0119288 A1 * | 5/2007 | Makino | 84/602 |
| 2008/0072740 A1 * | 3/2008 | Horii et al. | 84/609 |
| 2009/0249945 A1 * | 10/2009 | Yamashita et al. | 84/612 |

FOREIGN PATENT DOCUMENTS

| | | |
|---|---|---|
| EP | 1241588 A2 | 9/2002 |
| EP | 1585134 A1 | 10/2005 |
| JP | 04-351777 | 12/1992 |
| JP | 07-030876 | 1/1995 |
| JP | 2000-268047 A | 9/2000 |
| JP | 2003-134428 A | 5/2003 |
| JP | 03-173350 | 6/2003 |
| JP | 2004-085893 A | 3/2004 |
| WO | WO 01/86627 A2 | 11/2001 |
| WO | WO 2004/051657 A1 | 6/2004 |
| WO | WO 2004/072767 A2 | 8/2004 |

* cited by examiner

*Primary Examiner* — Marlo Fletcher

(74) *Attorney, Agent, or Firm* — Wolf, Greenfield & Sacks, P.C.

(57) ABSTRACT

An apparatus for reproducing a music content includes a first acquisition unit for acquiring data of a music content, a second acquisition unit for acquiring attribute information, a reproducing unit for reproducing, into an audio reproduction output, the music content data acquired by the first acquisition unit, a detecting unit for detecting bio-information of a listener listening to the audio reproduction output, and a setting unit for setting a next reproduction music content candidate based on the acquired bio-information of the listener and the attribute information acquired by the second acquisition unit.

38 Claims, 11 Drawing Sheets

MUSIC CONTENT REPRODUCTION APPARATUS, METHOD THEREOF AND RECORDING APPARATUS

CROSS REFERENCES TO RELATED APPLICATIONS

The present invention contains subject matter relates to Japanese Patent Application JP 2004-331583 filed in the Japanese Patent Office on Nov. 16, 2004, the entire contents of which are incorporated herein by reference.

BACKGROUND OF THE INVENTION

1. Field of the Invention

The present invention relates to a music content reproduction apparatus, method thereof, and a recording apparatus.

2. Description of the Related Art

Recording media, such as optical disks and hard disks, have a recording capacity large enough to store a great deal of music contents. Music content reproduction apparatuses employing such large-capacity recording media are also commercially available.

In such a music content reproduction apparatus, a user listening to music selects a music content from among many music contents and performs a reproduction operation.

For example, the music contents are sorted in a layer structure according to keywords, such as class, artists, and music of the 1970s. The user searches the music contents according one of the keywords, and selects the name of music as a music content.

Japanese Unexamined Patent Application Publication No. 2003-173350 discloses one system, which recommends a reproduction music content to the user referencing the user's reproduction history of music contents.

A music content is reproduced in known music content reproduction apparatuses in a manner intended by a producer of music, and the user's own personal preference is not reflected in the play style of music.

SUMMARY OF THE INVENTION

If a large number of music pieces, such several thousands to several tens of thousands of songs, are recorded on a recording medium, it is complicated to search for and select a desired music piece. It is difficult to find a music content in a short period of time.

When the user searches and selects the music contents, the guide for searching and selection is limited to the class, the names of artists, and the names of music pieces. Even if text information is used in a searching operation, the user cannot be sure whether the user actually likes the selected music piece until the user actually listens to the music.

Reproduction music candidates may be presented to the user based on the past reproduction history. Music contents may be automatically successively reproduced from among the large number of music contents. This arrangement eliminates the need for the user to consume time for searching and selection. In this case, the music contents the user may desire to listen to are not always presented.

The user simply listens to the music content in a fixed manner intended by the artists of the music content, due to limitations of the reproduction apparatus in one reason. The style and tempo of the music content are fixed and cannot be modified to the mood of the user, and remixing with another music content is not possible.

It is thus desirable to present music contents to the user as reproduction music content candidates matching the mood of a user and the listening environment, and to allow the user to reorganize a music content to reflect the user's own preference and the ambient environment in the music content on a real time basis.

An apparatus of one embodiment of the present invention for reproducing a music content includes a first acquisition unit for acquiring data of a music content to be reproduced, from a music content data storage unit having stored a plurality of music contents, a second acquisition unit for acquiring attribute information from an attribute information storage unit, the attribute information being associated with the music content and containing at least music structure information of the music content on a per musical unit basis, a reproducing unit for reproducing, into an audio reproduction output, the music content data acquired by the first acquisition unit, a detecting unit for detecting bio-information of a listener listening to the audio reproduction output, and a setting unit for setting a next reproduction music content candidate based on the acquired bio-information of the listener and the attribute information acquired by the second acquisition unit.

An apparatus of another embodiment of the present invention for reproducing a music content includes a first acquisition unit for acquiring data of a music content to be reproduced, from a music content data storage unit having stored a plurality of music contents, a second acquisition unit for acquiring attribute information from an attribute information storage unit, the attribute information being associated with the music content and containing at least music structure information of the music content on a per musical unit basis, a reproducing unit for reproducing, into an audio reproduction output, the music content data acquired by the first acquisition unit, a detecting unit for detecting bio-information of a listener listening to the audio reproduction output, a determining unit for determining, based on the acquired bio-information of the listener detected by the detecting unit, whether the listener shows preference to the music content currently being reproduced to the audio reproduction output, and, if the determining unit determines that the listener shows preference to the music content, a setting unit for searching, based on the attribute information acquired by the second acquisition unit, for another music content having attribute information containing music structure information similar to the music structure information contained in the attribute information of the music content currently being reproduced to set the other music content as a next reproduction music content candidate.

In accordance with embodiments of the present invention, the music reproduction apparatus determines whether the listener shows preference to the currently reproduced music content by acquiring and analyzing the bio-information of the listener. The music reproduction apparatus recognizes the style of the current music content from the attribute information of the current reproduction music content on a per musical unit basis.

If the listener's bio-information indicates that the listener shows preference to the currently reproduced music content, the reproduction apparatus presents, as a reproduction music content candidate, another music content similar in style to the currently reproduced music content. The music content having the style preferred by the listener is thus presented as the next reproduction music piece content.

If the reproduction apparatus determines based on the listener's bio-information that the listener shows no preference to the currently reproduced music content, the reproduction apparatus searches the attribute information of music contents for another music content different in style from the currently reproduced music content, and sets a found music content as a next music piece candidate. In this case, the reproduction apparatus preferably determines the next music piece candidate by referencing the reproduction history information and the acquired ambient environment information.

An apparatus of yet another embodiment of the present invention for reproducing a music content, includes a first acquisition unit for acquiring data of a music content to be reproduced, from a music content data storage unit having stored a plurality of music contents, a second acquisition unit for acquiring attribute information from an attribute information storage unit, the attribute information being associated with the music content and containing at least music structure information of the music content on a per musical unit basis, a reproducing unit for reproducing, into a audio reproduction output, the music content data acquired by the first acquisition unit, a detecting unit for detecting bio-information of a listener listening to the audio reproduction output, and a reorganizing unit for reorganizing the data of the reproduction music content based on the acquired bio-information of the listener and the attribute information acquired by the second acquisition unit.

Since the attribute information of the music content is obtained on a per musical unit basis, for example, on a per measure (bar) basis, the data of the music content can be reorganized on a per musical unit basis to enhance preference without changing the style of the music content if the listener shows preference to the currently reproduced music content. If the user shows no preference, the data of the music contents is reorganized on a per musical unit basis to change the style.

An apparatus of yet another embodiment of the present invention for reproducing a music content, includes a first acquisition unit for acquiring data of a music content to be reproduced, from a music content data storage unit having stored a plurality of music contents, a second acquisition unit for acquiring attribute information from an attribute information storage unit, the attribute information being associated with the music content and containing at least music structure information of the music content on a per musical unit basis, a reproducing unit for reproducing, into a audio reproduction output, the music content data acquired by the first acquisition unit, a reproduction history information storage unit for storing reproduction history information of music contents, and a reorganizing unit for reorganizing the data of the reproduction music content based on the reproduction history information acquired by the reproduction history information storage unit, and the attribute information of the reproduction music content.

In accordance with the embodiment of the present invention, the music content having a high frequency of reproductions, namely, favored by the user is detected from the past reproduction history. Using the attribute information of that music content and the attribute information of the currently reproduced music content, the music content data having the high frequency of reproductions in the past reproduction history is added on a per musical unit basis to the data of the currently reproduced music content in a manner such that the user is congenial to the resulting music content. Furthermore, the currently reproduced music content is reorganized in a style preferred by the user.

An apparatus of yet another embodiment of the present invention for reproducing a music content, includes a first acquisition unit for acquiring data of a music content to be reproduced, from a music content data storage unit having stored a plurality of music contents, a second acquisition unit for acquiring attribute information from an attribute information storage unit, the attribute information being associated with the music content and containing at least music structure information of the music content on a per musical unit basis, a reproducing unit for reproducing, into a audio reproduction output, the music content data acquired by the first acquisition unit, an ambient environment information acquisition unit for acquiring ambient environment information, and a reorganizing unit for reorganizing the data of the reproduction music content based on the ambient environment information acquired by the ambient environment information acquisition unit and the attribute information of the reproduction music content.

In accordance with embodiments of the present invention, the ambient environment information, such as the sea, a hill, morning, noon, night, etc., is acquired. The music content data is reorganized into music congenial to the user taking inconsideration the ambient environment information using the attribute information of the currently reproduced music content. The music content is thus reorganized in a style matching the ambient environment information.

DESCRIPTION OF THE PREFERRED EMBODIMENTS

Figure 1:
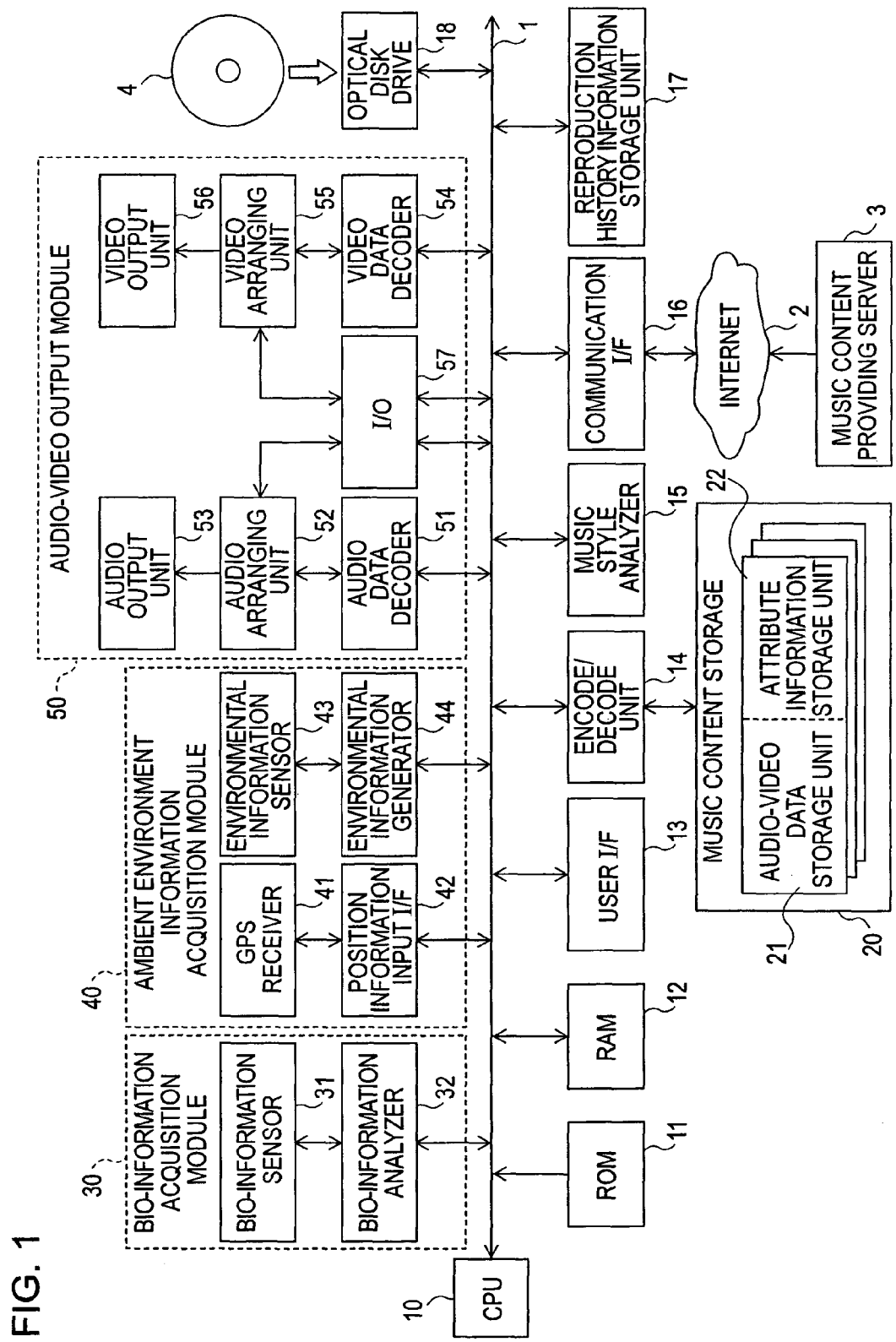
FIG. 1 is a block diagram of a recording and reproduction apparatus of one embodiment of the present invention incorporating a music content reproduction device and a recording device for recording a music content and attribute information thereof.

The embodiments of the present invention are described below with reference to the drawings. FIG. 1 is a block diagram of a recording and reproduction apparatus of one embodiment of the present invention incorporating a music content reproduction device and a recording device for recording a music content and attribute information thereof.

In this embodiment, the recording and reproduction apparatus includes a music content storage 20. The music content storage 20 stores audio-video data in addition to audio data of music as music content. The music content data stored in the music content storage 20 is accompanied by respective attribute information with identification information indicating correspondence between the music content data and the respective attribute information.

When the music content is stored with the attribute information associated therewith on a removable recording medium, such as a digital versatile disk (DVD) as described later, the attribute information is used.

When the music content data is transferred from the recording medium, such as the DVD, to a storage in the recording and reproduction apparatus for storage, the music content data is stored with the attribute information associated therewith.

If no attribute information is stored in the recording medium, the recording and reproduction apparatus generates required attribute information when the music content data is stored in the storage in the recording and reproduction apparatus. The generated attribute information is stored in association with the music content to be stored.

The recording and reproduction apparatus is also designed to download information of the music content from a music content providing server over the Internet.

In this case, it is assumed that the information of the music content from the music content providing server is accompanied by the attribute information. Upon receiving a request for a music content from the recording and reproduction apparatus, the music content providing server downloads the attribute information together with audio-video data of the requested music content to the recording and reproduction apparatus.

The recording and reproduction apparatus stores, onto the storage thereof, the downloaded audio-video data and the downloaded attribute information with the identification information of the music content associating the audio-video data with the attribute information.

The recording and reproduction apparatus includes a microcomputer. More specifically, the recording and reproduction apparatus includes a central processing unit (CPU) 10, a read-only memory (ROM) 11 and a random-access memory (RAM) 12 serving as a working memory area, and a system bus 1 for connecting these elements as shown in FIG. 1.

Also connected to the system bus 1 are a user interface 13, an encode/decode unit 14, a music style analyzer 15, a communication interface 16, a reproduction history information storage unit 17, and an optical disk drive 18.

The user interface 13 includes a button operation unit (not shown) receiving operational signals from a user, and a display such as a liquid-crystal display.

A music content storage 20 is connected to the encode/decode unit 14. The music content storage 20 herein includes a large capacity hard disk device. Alternatively, the music content storage 20 may include a read/write device working with a rewritable large-capacity optical disk.

When data is written onto a hard disk device forming the music content storage 20, the encode/decode unit 14 performs an encode process on the data in accordance with a format that allows the data being written to be recorded onto the hard disk device. The encode/decode unit 14 performs a decode process on the data read from the hard disk device in a manner corresponding to the encode process. The encode process can include a data compression process. The decode process can thus include a data decompression process.

The music content data contains not only music data but also video data of the music content, and attribute information (to be discussed later) in association with the music content.

The music content storage 20 includes an audio-video storage unit 21 storing music data of the music content and video data, and an attribute information storage unit 22 storing attribute information corresponding to the music data and the video data. The music content identification (ID) information identifying each music content associates attribute information stored in the attribute information storage unit 22 with the music data and the video data in the audio-video storage unit 21 on a per music content basis.

When the music data of the music content is stored onto the audio-video storage unit 21 in the music content storage 20, the music style analyzer 15 analyzes the music data to detect delimitation separating one musical unit from another musical element and extract the music structure information on a per musical unit basis. The music structure information is recorded on the attribute information storage unit 22 as part of the attribute information. The music style analyzer 15 operates only when the information of the music content is accompanied by the attribute information. The extracted music structure information is recorded as part of the attribute information.

The musical unit refers to a unit to which a chord can be attached. For example, the musical unit can be the beat or the measure of music. The music structure information includes information serving as a standard that determines the style of music, such as the tempo, keys, chord, volume, beats, musical notes, chord progression, etc.

The communication interface 16 is used to connect to a music content providing server 3 via an external network, such as the Internet 2. The music content providing server 3 herein is organized to provide not only the music data and the video data but also the attribute information of the music content.

A reproduction history information storage unit 17 stores reproduction history information of a music content, namely, the frequency and time of reproductions of the music content performed on the recording and reproduction apparatus. The frequency of reproductions and the reproduction time, and ambient environment information during the reproduction are stored in association with the identification information of the reproduced music content (content ID) on the reproduction history information storage unit 17.

An optical disk drive 18 reads the music data and the video data from an optical disk 4, such as a compact disk (CD), or a digital versatile disk (DVD). If the optical disk 4 stores the attribute information of the music content, the attribute information is also read together therewith.

Further connected to the system bus 1 in the recording and reproduction apparatus are a bio-information acquisition module 30, an ambient environment information acquisition module 40, and an audio-video output module 50.

The bio-information acquisition module 30 includes a bio-information sensor 31 and a bio-information analyzer 32. The bio-information sensor 31 collects information to determine whether a listener shows preference to a music content currently heard by the listener. The bio-information sensor 31 detects bio-information, such as the motion, the respiration, the pulse rate, the blood pressure, the body temperature, the skin perspiration, and the skin resistance of the listener, and supplies the bio-information to the bio-information analyzer 32.

If the listener shows preference to the music, in other words, the music is congenial to the listener, the motion and the respiration of the listener may be synchronized with the rhythm and the tempo of the music performed. For example, if a slow-tempo style is performed, the motion and the respiration of the listener also become slow. If the music sharply shifts to a larger sound, the listener moves more largely. The listener may inspire, and hold one's breath, and then expire in a big action.

In a music part causing the listener to feel high, the pulse rate and the heart beat rate of the listener become high while the listener perspires more. In a slow music part, the pulse rate and the heart beat rate may also become slow.

The bio-information analyzer 32 receives feeling information of the listener from the bio-information sensor 31, and supplies, to the system bus 1, determination results indicating whether the listener shows preference to the music. The bio-information analyzer 32 references the music structure information of the currently reproduced music, thereby determining whether the motion of the listener is synchronized with the music.

In accordance with this embodiment, the bio-information analyzer 32 holds a plurality of threshold values according to which the degree of preference is determined based on the bio-information concerning the motion of the listener. For example, the bio-information analyzer 32 outputs determination results categorized into a plurality of classes, including a class in which "the listener shows no preference", a class in which "the listener shows a modest degree of preference", and a class in which "the listener shows a high degree of preference".

The ambient environment information acquisition module 40 includes a GPS receiver 41, a position information input interface 42, an environmental information sensor 43, and an environmental information generator 44.

The GPS receiver 41 calculates the position thereof from radiowaves received from a plurality artificial satellites, and sends the calculation results to the position information input interface 42. The position information input interface 42 converts the position calculation results of the GPS receiver 41 into position information such as a geographic name, and then supplies the position information to the system bus 1. The position information, indicating the place of recording, is recorded as part of the ambient environment information, namely, part of the attribute information of the music content when the music content is recorded.

The environmental information sensor 43 includes a time measurement unit detecting the date and time and the season, in addition to a temperature sensor unit and a humidity sensor unit. The environmental information generator 44 receives information output from the environmental information sensor 43, and outputs the information concerning the temperature, the humidity, the season, and the date and time to the system bus 1. The information is recorded as part of the ambient environment information, namely, part of the attribute information of the music content when the music content is recorded.

The audio-video output module 50 includes an audio data decoder 51, an audio arranging unit 52, an audio output unit 53, a video data decoder 54, a video arranging unit 55, a video output unit 56, and an input and output port 57.

If input audio data is a pulse code modulation (PCM) audio signal, namely, a non-compressed audio signal, the audio data decoder 51 outputs the audio data, as is, to the audio output unit 53 via the audio arranging unit 52. If the input audio data is compressed using adaptive transform acoustic coding (ATRAC) technique or advanced audio coding (AAC) technique, the audio data decoder 51 decomposes and decodes the input audio data into a digital audio signal. If the input audio signal is a music instrument digital interface (MIDI) signal, the audio data decoder 51 decodes the MIDI signal into a digital audio signal.

The audio arranging unit 52 performs a sound effect process on the input audio signal in response to a control signal supplied via the input and output port 57, or remixes data of another music content to the input audio data.

In this embodiment, the sound effect process performed by the audio arranging unit 52 includes applying distortion or reverberation onto the audio data.

The remixing process is a technique widely performed in disk jockey. In the remixing process, a plurality of music elements are mixed with the currently played music by measure or beat in a manner such that music expression is not destroyed. A plurality of music elements are remixed with the currently played music without discordance in accordance with music theory using the music structure information including prepared ends of measures (delimitation of musical unit), tempo information, and chord information.

In the remixing process, the audio data extracted from music other than the currently played music and to be remixed with the currently played music is supplied to the audio data decoder 51 in response to a command from the central processing unit (CPU) 10. In accordance with this embodiment, the audio data decoder 51 concurrently performs a decode process of decoding the currently reproduced audio data and a decode process of decoding the audio data to be remixed.

The output of the audio arranging unit 52 is supplied to the audio output unit 53. The audio output unit 53 converts the input digital audio signal into an analog audio signal, and supplies the converted analog audio signal to a loudspeaker via an output amplifier (not shown) or to a headphone (not shown) via an output terminal for sound outputting.

The video data decoder 54 decodes (decomposes) compressed video data accompanying the music content. The compressed video data can be still image data compressed in accordance with one of joint photographic experts group (JPEG) standard, or moving image data compressed in association with moving picture experts group (MPEG) 2 standard, or MPEG 4 standard. The video data decoder 54 has a function to decode the compressed video data.

The video data decoded by the video data decoder 54 is supplied to the video arranging unit 55. The video arranging unit 55 performs a special-effect process on the video data. The special-effect process is performed using known techniques and is not discussed in particular herein.

The output video data of the video arranging unit 55 is supplied to the video output unit 56. The video output unit 56 outputs the digital video data as is, or converts the digital video data into an analog video signal, and then supplies the resulting signal to a display via a video output terminal to display an image corresponding to the video data.

In accordance with the present embodiment, the attribute information recorded together with the music content includes the following information.

The music structure information included in the attribute information includes delimitation information for delimiting the music elements, information of the tempo, key, chord, volume, and beat, information of music note, information of chord progression, and information of a rising edge of looping music waveform for repeated remixing.

The music structure information indicates the style of the music. The recording and reproduction apparatus of the music content analyzes the music structure information, and determines that two music contents similar in the music structure information are similar in style as well. If the listener shows preference to the reproduced music, the recording and reproduction apparatus selects, as a next reproduction music content candidate, a music content similar in style to the currently reproduced music content based on the analysis results of the music structure information.

If the listener shows no preference to the currently reproduced music, the recording and reproduction apparatus selects, from past reproduction history, music contents the listener seems to like, examines the attribute information of those music contents, and selects, as a next reproduction music content candidate, a music content having similar attribute information. Based on the reproduction history, the recording and reproduction apparatus selects, a next reproduction music content candidate, a music content similar in style to the music content the listener seems to like.

The remixing process free from discordance is performed using the delimitation information of the musical unit, and the information of the tempo of the music and the chord progression contained in the music structure information.

The audio-video data of the music content is precisely associated with the attribute information. For example, time chord information of the delimitation of a measure, as musical unit, described as the attribute information accurately matches a time chord of a measure of the actual audio-video data.

The music structure information includes effect information. The effect information, related to an effect added to the music content, is composed of effect parameters for the above-mentioned distortion and reverberation. If the effect parameters vary with time, the effect information is parameter information that also varies with time.

The recording and reproduction apparatus of the music content can feature a plurality of types of fixed effect information. If effective and recommendable effect information is available for each music piece, such effect information can be contained as part of the attribute information. The recommendable effect information can be provided by the producer of the music content, for example. At least one type of effect information can be contained as the attribute information.

The music structure information includes musical instrument information. The musical instrument information is related to musical instruments used in the music piece, such as a drum, a guitar, etc. For example, a play pattern of a one measure of a drum or a percussion instrument is recorded as the attribute information, and the pattern is repeatedly looped. The play pattern information of the musical instrument can be used for the remixing process.

The recording and reproduction apparatus can prepare a plurality of pieces of the play pattern information of the one measure of the drum or the percussion instrument for the remixing process rather than recording the play pattern information as the attribute information.

The music structure information includes player information. The player information relates to names of players (player groups) of the music piece, sex, age, and group members.

Figure 2:
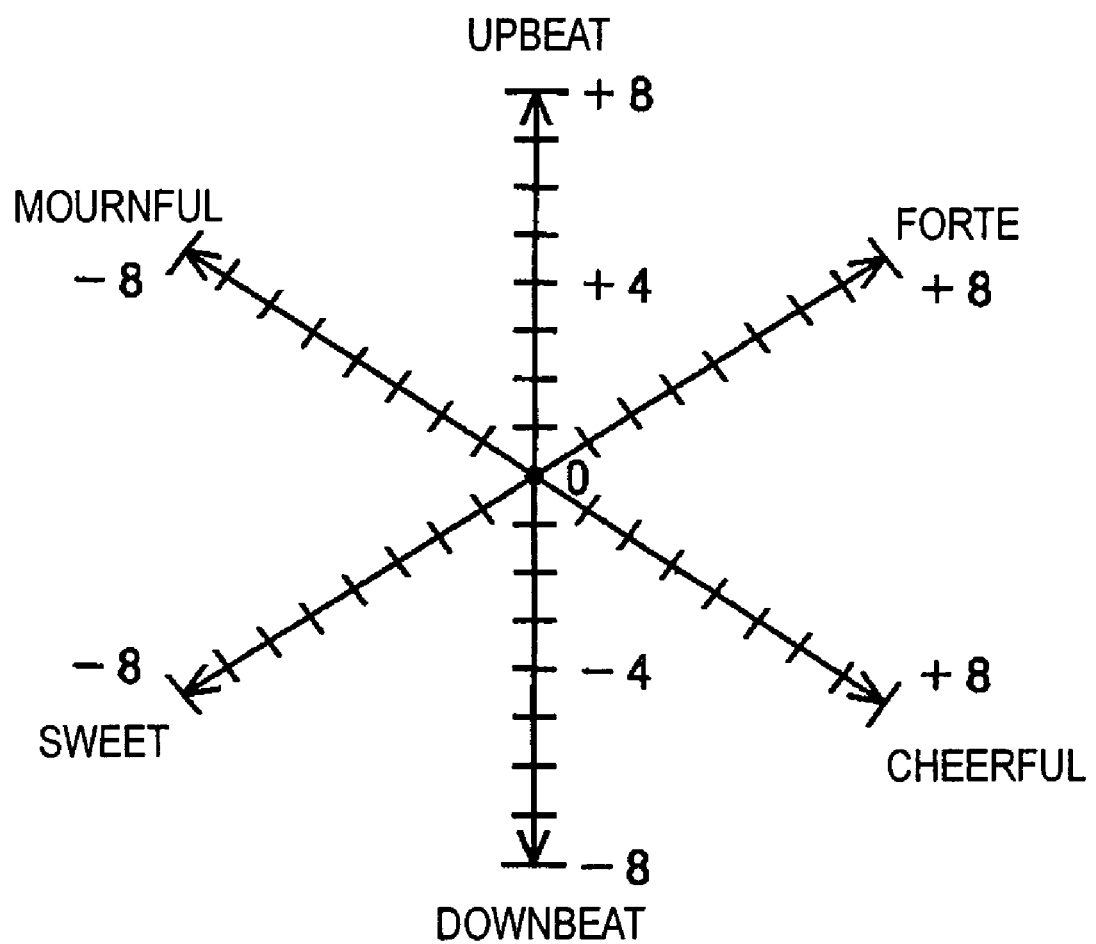
FIG. 2 is a chart illustrating part of the attribute information used in the music content reproduction apparatus of FIG. 1.

The music structure information includes feeling information. The feeling information relates to feeling recognition of the listener listening to the music piece, and is data that is quantified according to criteria whether the music piece is upbeat or downbeat, forte or sweet, cheerful or mournful, etc. As shown in FIG. 2, upbeat or downbeat music, forte or sweet music, cheerful or mournful music, etc., are defined along respective feeling axes. The feeling recognition is subjectively numerically rated along the feeling axis, by the listener, for example.

As shown in FIG. 2, the degree of the subjective feeling recognition is 16-level quantized along the upbeat/downbeat feeling axis. As shown in FIG. 2, the more upbeat the greater the number level. The number determined as the most upbeat is assigned "−8". The same is true of the forte/sweet feeling axis and the cheerful/mournful feeling axis.

When the levels of the feeling axes are determined as shown in FIG. 2, the levels are connected by lines, and a polygon (triangle) responsive to the style is obtained. Using the feeling axis, the style of the music piece is easily determined.

The attribute information may be recorded in association with the music content on a recording medium, or supplied from a music content providing server. In this case, tens of listeners may be requested to listen to a music piece of interest for subjective feeling evaluation along each feeling axis, and the mean value along each feeling axis may be adopted as the feeling information.

As will be described later, the user of the recording and reproduction apparatus as a listener may listen to the music piece to enter settings as the feeling information. As a result of user listening, the listener may find himself disagreeable with the numerical value of the feeling information contained in the attribute information recorded on the recording medium and the notification of the feeling information contained in the attribute information acquired from the music content provider server. In such a case, the listener can rewrite the numerical value of the feeling information as the feeling information contained in the attribute information to be stored in the music content storage 20 of the recording and reproduction apparatus.

The music structure information further includes the ambient environment information. The ambient environment information is set and input by a producer of the DVD or a provider of the music content from the music content provider server. The ambient environment information includes geographical information related to a hill, the sea, etc., where listening to the music piece is recommended. As will be discussed later, the ambient environment information may include information related to the location, the date and time, the season, the temperature, and the humidity acquired by the ambient environment information acquisition module 40 during recording of the music piece on the recording and reproduction apparatus. The ambient environment information may also include geographical information set and input by the user and related to a location where listening to the music piece is recommended.

The music structure information further includes the reproduction history information. The reproduction history information shows how often and how long the user listens to what music piece. As previously discussed, the reproduction history information is stored in the reproduction history information storage unit 17 in the recording and reproduction apparatus. The reproduction history information is contained in the attribute information when the music content data is recorded onto the music content storage 20. The reproduction history information is stored as part of the attribute information in the attribute information storage unit 22 in the music content storage 20.

The reproduction history information is contained in neither the attribute information of the DVD produced by the producer nor the attribute information of the music content acquired from the server.

The recording process of the recording and reproduction apparatus of the present embodiment is described below. The recording process of the recording and reproduction apparatus is performed in several methods.

In one method, the data of the music content recorded on the DVD is read and written onto the music content storage 20. In another method, the data of the music content is downloaded from the music content providing server 3 via the Internet 2 for recording. In yet another method (not shown), the data of the music content is supplied from another reproduction apparatus, and then recorded onto the music content storage 20.

If the attribute information is contained in the data of the music content in each of the above-mentioned methods, the recording and reproduction apparatus reads the attribute information in addition to the audio-video data of the music content, and writes the attribute information and the music content data to the music content storage 20. The recording and reproduction apparatus is designed to permit the user to add information to or modify the attribute information if the user wants to do so during recording.

If the data of the music content contains only the audio-video data, the recording and reproduction apparatus generates attribute information, and stores the generated attribute information onto the attribute information storage unit 22 in the music content storage 20.

The music style analyzer 15 analyzes the audio data read from the DVD, downloaded via the Internet 2, or input via external input terminal, acquires the music structure information, and records the music structure information as part of the attribute information. The user enters the numerical values at one of 16 levels, as the feeling information of the subjective feeling recognition obtained when the user has actually listened to the music piece. The feeling information is recorded as part of the attribute information. The ambient environment information acquired by the ambient environment information acquisition module 40 is also recorded as part of the attribute information. The reproduction history information is also recorded as part of the attribute information as necessary.

In accordance with the present embodiment of the present invention, an attribute information providing server storing the attribute information in association with the identification information of the music content is arranged over the Internet 2. The recording and reproduction apparatus transmits a download request to download the identification information of the music content, and then receives the attribute information corresponding to the identification information of the music content.

Figure 3:
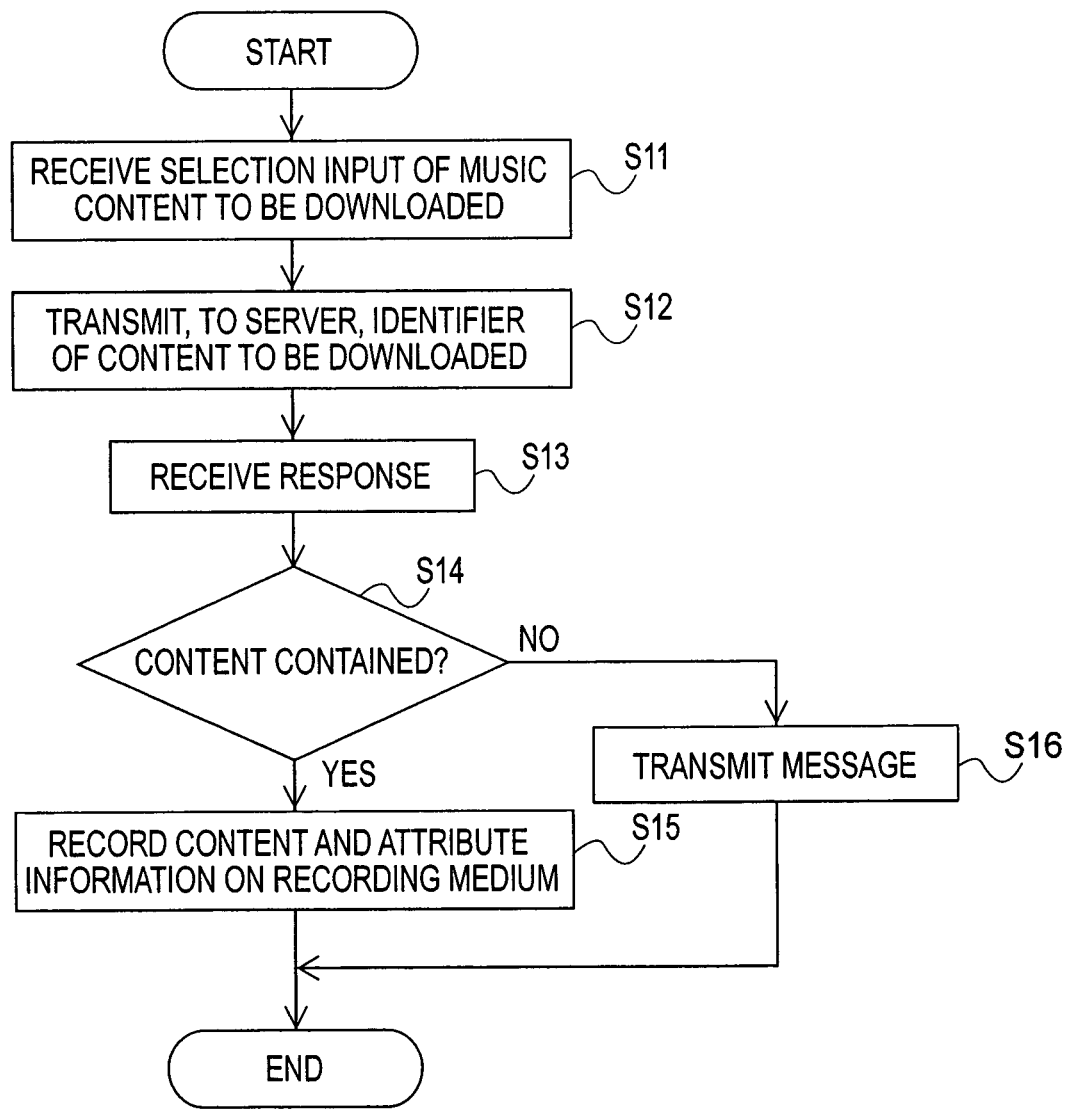
FIG. 3 is a flowchart illustrating a process of the recording and reproduction apparatus of FIG. 1.
Figure 4:
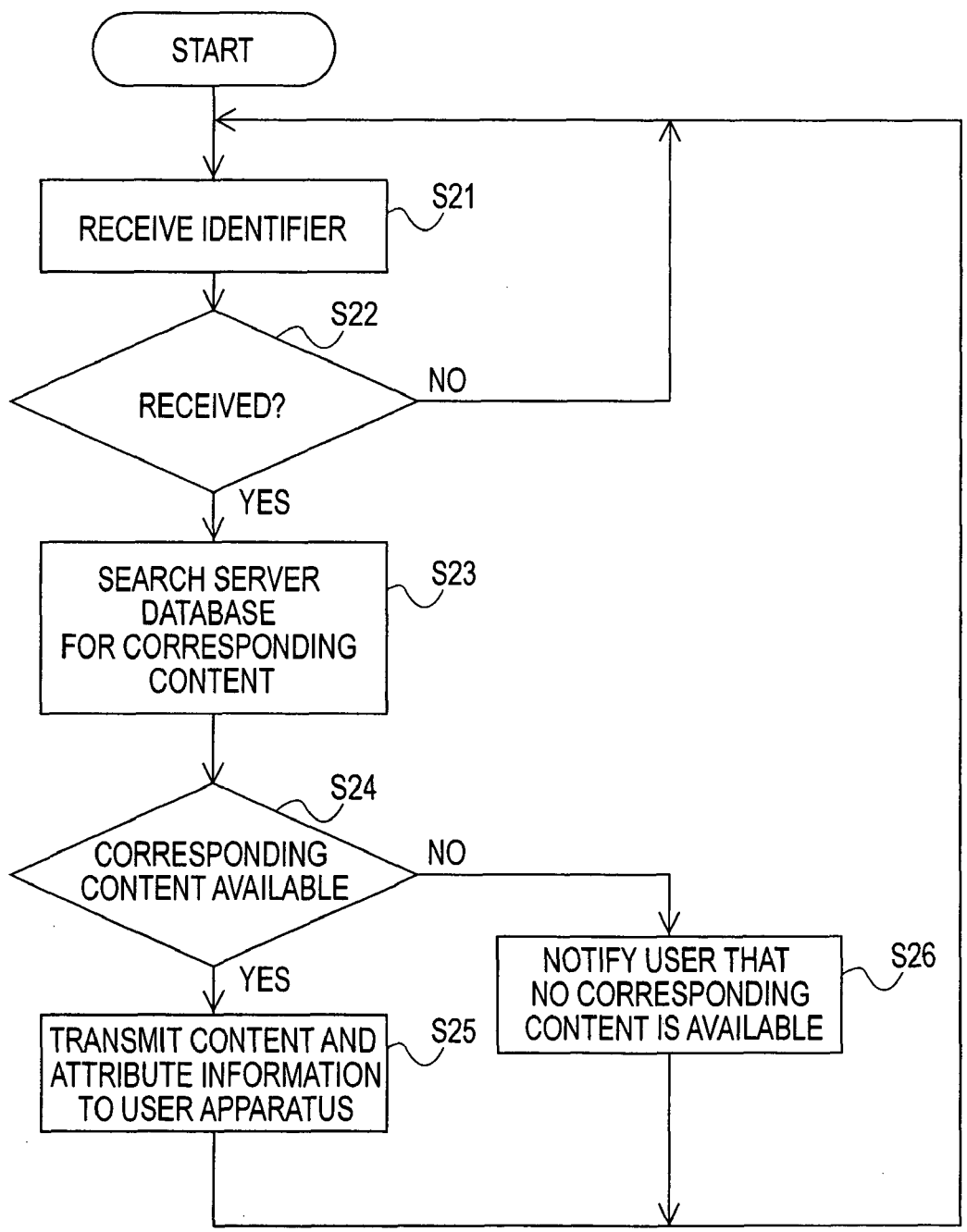
FIG. 4 is a flowchart illustrating the process of the recording and reproduction apparatus of FIG. 1.

FIGS. 3 and 4 are flowcharts of the process of the recording and reproduction apparatus and the music content providing server 3. The recording and reproduction apparatus receives the music content and the attribute information from the music content providing server 3.

In this process, the recording and reproduction apparatus receives the music content and the attribute information associated with the music content from the music content providing server 3. The process substantially remains the same when the attribute information is exchanged among a plurality of different recording and reproduction apparatuses.

FIG. 3 is the flowchart illustrating the process of the recording and reproduction apparatus that requests the music content providing server 3 to transmit the data of the music content and the attribute information associated therewith. FIG. 4 is the flowchart illustrating the process of the music content providing server 3 that supplies the recording and reproduction apparatus with the data of the music content and the attribute information associated therewith.

When a predetermined operation is initiated on the recording and reproduction apparatus to request the music content data and the attribute information associated therewith, the CPU 10 performs the process of FIG. 3. The CPU 10 first receives an input of selecting a music content to be downloaded (step S11).

In response to the selection input, the CPU 10 generates a request to supply the music content containing an identifier of the requested music content, and transmits the request to the music content providing server 3 via the communication interface 16 and the Internet 2 (step S12).

The controller (CPU) in the music content providing server 3 executes the process of FIG. 4. More specifically, the controller waits for the supply request of the music content from the recording and reproduction apparatus via the Internet 2 and a communication interface of the music content providing server 3 (step S21). The music content providing server 3 determines whether the supply request has been received (step S22). If the music content providing server 3 determines in step S22 that the supply request of the music content has not been received, steps S21 and S22 are repeated until the supply request of the music content is received.

If the controller in the music content providing server 3 determines in step S22 that the supply request of the music content has been received from the recording and reproduction apparatus, the controller in the music content providing server 3 searches for the target music content data and the attribute information associated therewith, from the music contents stored in the music content providing server 3, based on the identifier of the music content contained in the received supply request (step S23).

The controller in the music content providing server 3 determines whether the target music content data is present (step S24). If it is determined that that requested music content data is present, the controller in the music content providing server 3 transmits the requested music content data to the requesting recording and reproduction apparatus via the communication interface and the Internet 2 (step S25). Processing returns to step S21 to repeat steps S21 and subsequent steps.

If the controller in the music content providing server 3 determines in step S24 that the requested music content data is not present, the controller in the music content providing server 3 generates a reply message indicating that the requested music content data is not available, and transmits the reply message to the requesting recording and reproduction apparatus via the communication interface and the Internet 2 (step S26). Processing returns to step S21 to repeat step S21 and subsequent steps.

The requesting recording and reproduction apparatus receives the reply from the music content providing server 3 via the communication interface 16 (step S13). In response to the received reply message, the recording and reproduction apparatus determines whether the requested music content data has been transmitted (step S14). Upon determining that the requested music content data has been received, the recording and reproduction apparatus records the received music content data and the attribute information associated therewith onto the music content storage 20 (step S15). The process of FIG. 3 thus ends.

If it is determined in step S14 that the requested music content data has not been received (in other words, the reply message that the corresponding music content data is not available is received), the CPU 10 in the recording and reproduction apparatus notifies the user of the recording and reproduction apparatus that the requested music content data is not available (step S16). This notification is performed by using a display element such as a liquid-crystal display (LCD), or a light-emission device such as a light-emitting diode (LED), or a buzzer or alarm (not shown in FIG. 1) of own apparatus. The process of FIG. 3 thus ends.

When receiving the target music content data, the recording and reproduction apparatus also receives the attribute information associated with the music content data. The supplied music content data and the attribute information associated therewith are stored in the music content storage 20 for reproduction.

If the music content is not associated with the attribute information, the recording and reproduction apparatus generates attribute information from the music structure information obtained by the music style analyzer 15 as a result of analysis, and the ambient environment information acquired by the ambient environment information acquisition module 40. The generated attribute information is stored in association with the audio-video data of the music content onto the music content storage 20.

Figure 5:
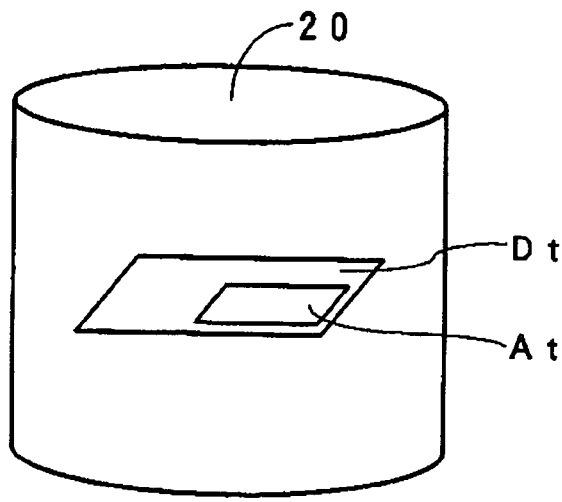
FIG. 5 illustrates a music content storage of FIG. 1.

FIG. 5 illustrates a hard disk drive 20HD as one example of the music content storage 20 in the recording and reproduction apparatus of this embodiment of the present invention. The hard disk drive 20HD as the music content storage 20 includes a region 23 of audio-video data Dt, such as the video data and the audio data of the music content, and a region 24 for attribute information At. The region 23 forms the audio-video storage unit 21 while the region 24 forms the attribute information storage unit 22.

Figure 6:
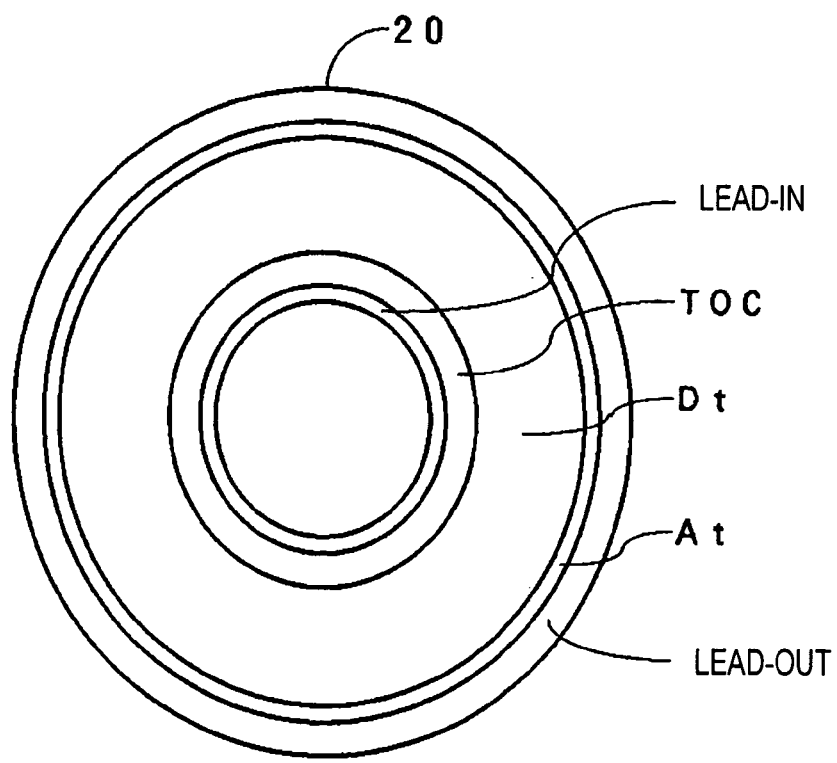
FIG. 6 illustrates the music content storage of FIG. 1.

The music content storage 20 in this embodiment is the hard disk drive. A removable disk medium, such as a DVD can be used for the music content storage 20. FIG. 6 illustrates a rewritable disk medium 20RD as another example of the music content storage 20.

As shown in FIG. 6, the audio-video data Dt, such as audio content data and video content data, is stored in the optical disk 20RD. The optical disk 20RD includes a storage area for the attribute information At in addition to a lead-in area, a table of content (TOC) area, and a lead-out area typically arranged in a standard optical disk. If the content data Dt contains a plurality of music pieces, the attribute information for the respective music pieces is recorded. As previously discussed, the identification information of the music content causes the content data Dt to associate with the attribute information At.

The optical disk 20RD is a commercially available one for storing the music content data, and the music content is recorded typically by a producer of the optical disk 20RD. Furthermore, a user can produce the optical disk 20RD by recording thereon a music content downloaded via the Internet using the user's own personal computer.

With the recording and reproduction apparatus as shown in FIGS. 5 and 6, the user can rewrite, add data to, delete the attribute information At recorded onto the recording medium or replace the attribute information At with new attribute information. If the delimitation information is added on a per musical unit to the attribute information, the recording and reproduction apparatus generates new delimitation information on a per musical unit by automatically analyzing the target music content data. The recording and reproduction apparatus can also add delimitation information input by the user via the user interface 13.

In response to a modification command from the user via the user interface 13, the recording and reproduction apparatus can modify the attribute information recorded on the music content storage 20. Similarly, in response to a modification command from the user via the user interface 13, the music content storage 20 can delete the attribute information recorded on the music content storage 20, or can replace the attribute information recorded on the music content storage 20 with the newly generated attribute information or the input attribute information.

New attribute information can be received via the Internet 2 and the music style analyzer 15, or from another external recording and reproduction apparatus connected to a digital interface such as a universal serial bus (USB), or via a wireless local area network (LAN), a wireless interface, and a transceiver antenna. The attribute information thus received is used for addition and replacement.

In each of the above cases, the identifier of the music content causes the music content data to associate with the attribute information, and the correspondence between the attribute information and the music content data is distinctly shown.

Since the music content is associated with the attribute information, the attribute information is circulated together with the music content data. As the music content data is used, the attribute information thereof is also effectively used. The music content data is used in new ways.

If the music content data is associated with the attribute information, the optical disk 4 to be read by the optical disk drive 18 has the same structure as the optical disk 20RD of FIG. 6.

Figure 7:
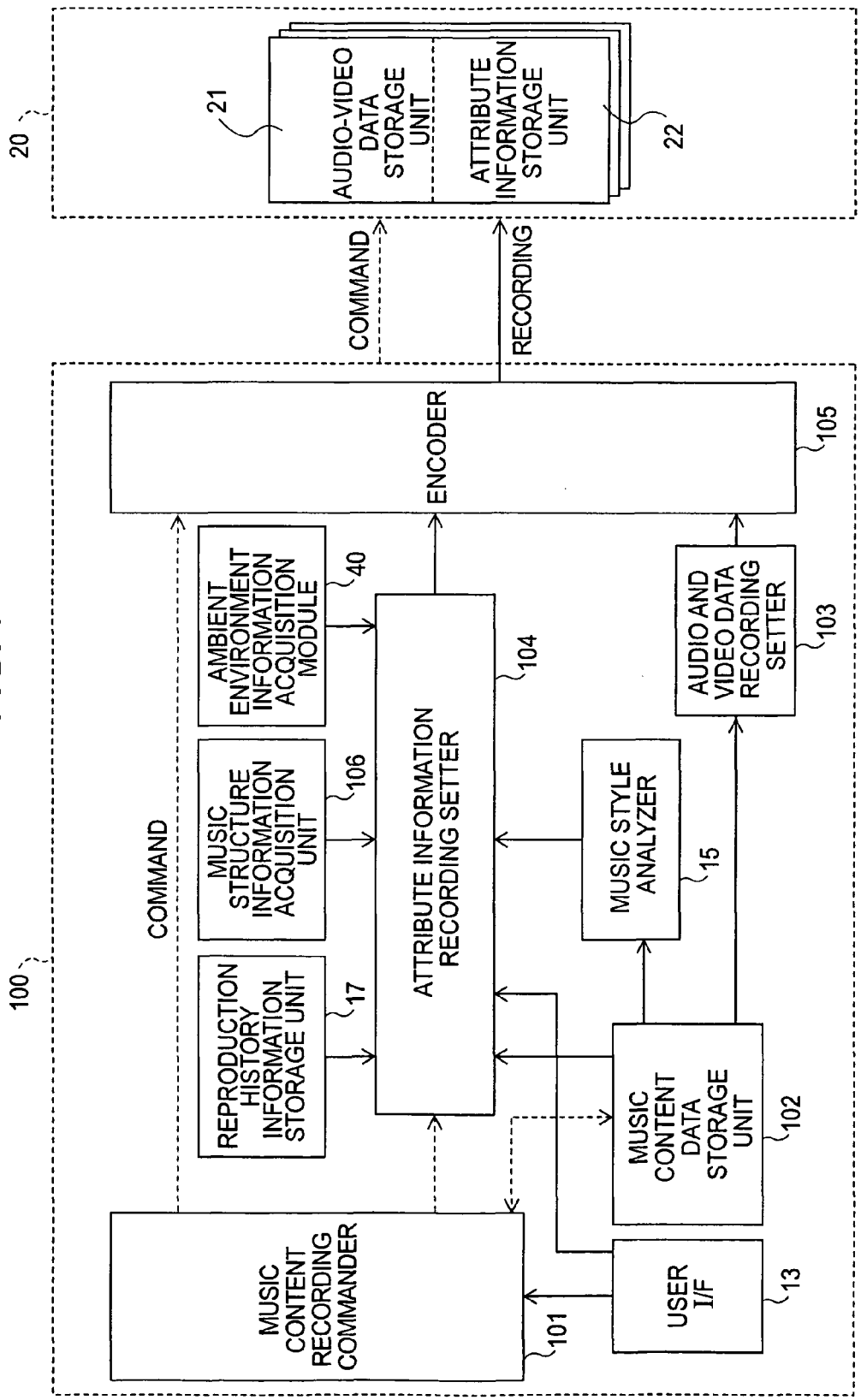
FIG. 7 is a functional block diagram illustrating a recording section of the recording and reproduction apparatus of FIG. 1.
Figure 8:
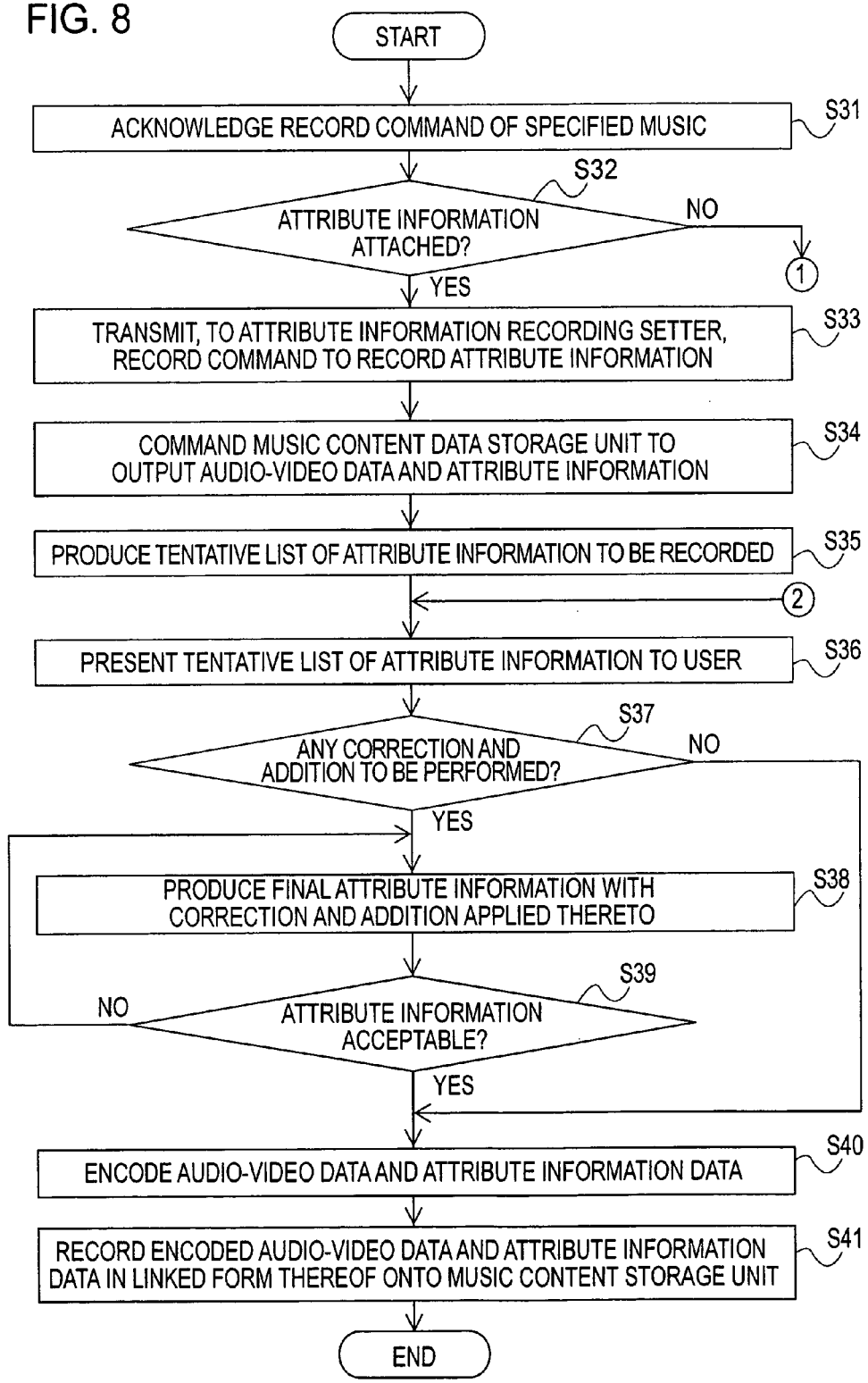
FIG. 8 is a flowchart illustrating the recording process of the recording and reproduction apparatus of FIG. 1.
Figure 9:
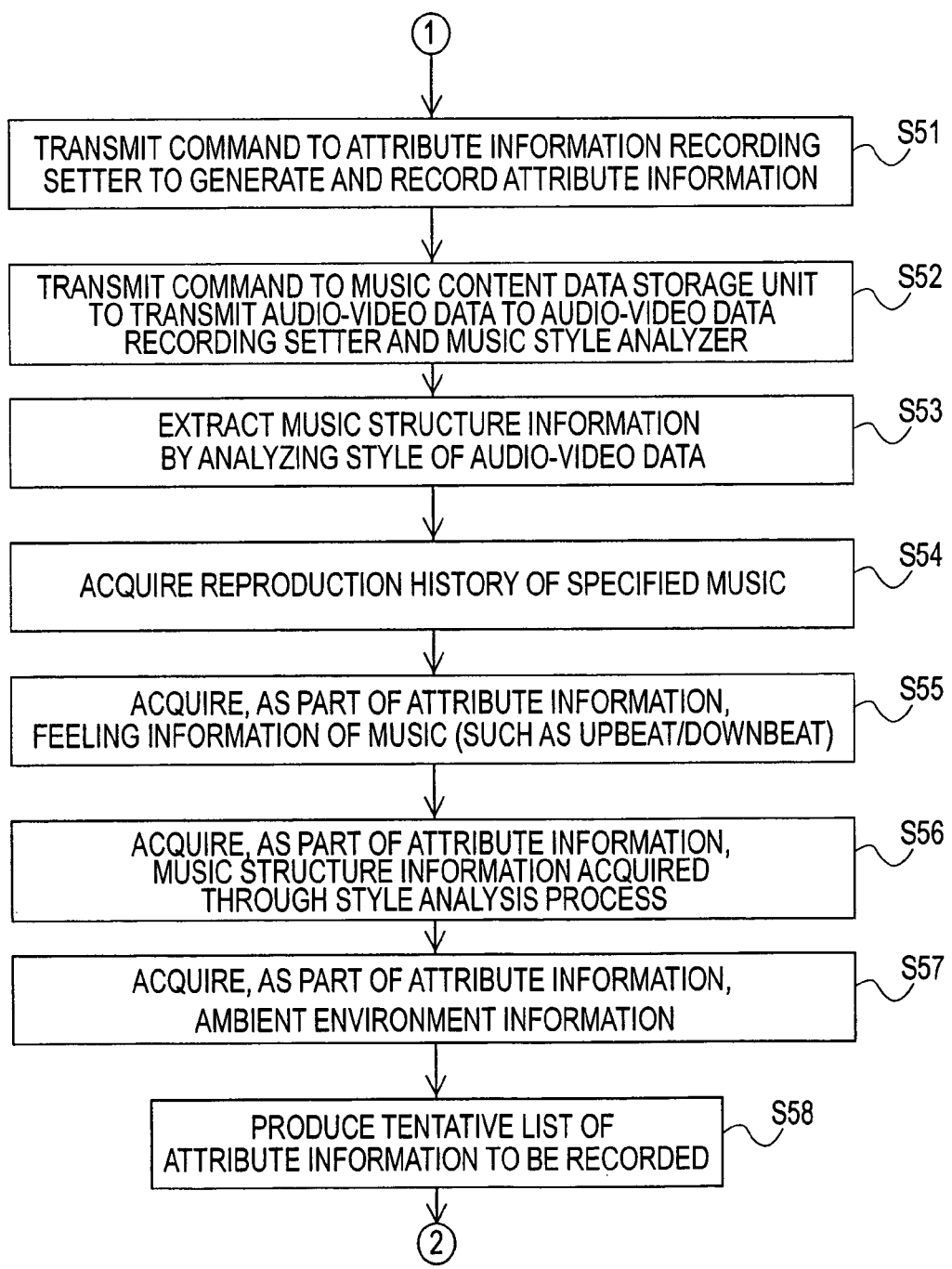
FIG. 9 is a continuation of the flowchart of FIG. 8.

A recording process of the recording and reproduction apparatus of FIG. 1 is described below. FIG. 7 is a functional block diagram illustrating the recording section of the recording and reproduction apparatus. FIGS. 8 and 9 are flowcharts illustrating the recording process.

As shown in FIG. 7, the recording and reproduction apparatus includes two functional elements, namely, a recorder 100 and a music content storage 20 in the recording process. The music content storage 20 stores a plurality of music contents, and the recorder 100 stores a single music content. The music content storage 20 has already been discussed. The recorder 100 performs the recording process of recording the music content data and the attribute information. The structure of the recorder 100 is described below.

The recorder 100 stores the input music content data (audio-video data) and the attribute information in association with the input music content data onto the music content storage 20. If the attribute information in association with the music content is input, the attribute information is stored onto the attribute information storage unit 22 in the music content storage 20, as is, or in a partly modified form, or with data added thereto.

If the music content data is not associated with attribute information, the recorder 100 generates attribute information, attaches the generated attribute information to the music content data, and then stores the resulting data onto the attribute information storage unit 22 in the music content storage 20.

When the attribute information is attached to the music content data, the user's own subjective determination is used. However, the recording and reproduction apparatus can automatically calculate part of the attribute information from the audio-video data. More specifically, the tempo information as the music structure information, namely, part of the attribute information, the position information of the recording and reproduction apparatus, and the ambient environment information are automatically calculated and added. The recording and reproduction apparatus acquires only the music structure information and the ambient environment information, and the final determination of determining the appropriateness of the attribute information to be attached to the music content is left to the user's responsibility.

As shown in FIG. 7, the recorder 100 includes the user interface 13, the music style analyzer 15, the reproduction history information storage unit 17, and the ambient environment information acquisition module 40. The recorder 100 further includes, as functional elements, a music content recording commander 101, a music content data storage unit 102, an audio-video data recording setter 103, an attribute information recording setter 104, an encoder 105, and a music structure information acquisition unit 106.

In response to a user instruction input via the user interface 13, the music content recording commander 101 performs recording command control for recording the music content, and corresponds to the process of the CPU 10 that operates using a RAM 12 as a working area under the control of a recording program stored in the ROM 11.

The music content data storage unit 102 corresponds to a portion holding the audio-video data to be recorded, and the attribute information associated therewith.

If a source of the music content to be recorded is the optical disk 4 to be read by the optical disk drive 18, the music content data storage unit 102 corresponds to the optical disk 4 and the optical disk drive 18.

If a source of the music content to be recorded is the music content providing server 3 linked via the Internet 2, the music content data storage unit 102 corresponds to a buffer memory temporarily storing the music content data retrieved via the communication interface 16.

The encoder 105 corresponds to only an encode function of the encode/decode unit 14.

The audio-video data recording setter 103 stores the audio-video data to be transferred to the encoder 105, and a portion of the RAM 12 serves as the audio-video data recording setter 103.

An attribute information recording setter 104 stores data of the attribute information to be transferred to the encoder 105, and a portion of the RAM 12 also serves as the attribute information recording setter 104.

If the music content data is associated with no attribute information, the music structure information acquisition unit 106 acquires attribute information corresponding to the music content. The music structure information acquisition unit 106 may include a functional element that acquires the attribute information corresponding to the music content ID by accessing the attribute information providing server via the Internet with the music content ID as a search key. The music structure information acquisition unit 106 may also include a functional element that acquires the attribute information corresponding to the music content from the other recording and reproduction apparatus.

The recording process is described below with reference to flowcharts of FIGS. 8 and 9. The CPU 10 performs the process steps in FIGS. 8 and 9 using the RAM 12 as a working area in association with the program stored in the ROM 11.

Before recording, the user prepares the data of a music piece the user desires to record as a music content, and stores the music content data in the music content data storage unit 102. If the music content is associated with attribute information, the music content data storage unit 102 also stores the attribute information of the music piece. The music content data storage unit 102 notifies the music content recording commander 101 whether the music piece is associated with the attribute information. The music content recording commander 101 recognizes beforehand whether the music content to be recorded is associated with the attribute information.

When the user issues a record command from an operation unit of the user interface 13, the music content recording commander 101 recognizes the record command of the specified music piece (step S31 of FIG. 8). Upon recognizing the record command, the music content recording commander 101 determines whether the specified music piece is associated with the attribute information (step S32). If it is determined that the music piece is associated with the attribute information, the music content recording commander 101 supplies the record command to the attribute information recording setter 104 to record the attribute information in association with the music content (step S33).

The music content recording commander 101 commands the music content data storage unit 102 to supply the audio-video data of the music content stored therewithin to the audio-video data recording setter 103 and the corresponding attribute information to the attribute information recording setter 104 (step S34). In response to the command, the music content data storage unit 102 transfers the audio-video data of the music content to be recorded, together with the music content ID thereof, to the audio-video data recording setter 103 while transferring the corresponding attribute information together with the music content ID thereof to the attribute information recording setter 104.

Upon receiving the attribute information (containing the music content ID) from the music content data storage unit 102, the attribute information recording setter 104 generates a tentative list of the attribute information to be recorded (step S35), and presents the generated tentative list of the attribute information to the user by displaying the tentative list of the attribute information on a display of the user interface 13 for example (step S36).

The user then views the tentative list of the attribute information to be recorded. If the user then feels it necessary to modify or add data to the attribute information, the user operates the operation unit of the user interface 13 to perform a predetermine operation. If the user is satisfied with the attribute information, the user operates an enter key on the user interface 13 to enter the attribute information.

The music content recording commander 101 determines whether the user has input one of a modification command for modification of the attribute information and an addition command for addition to the attribute information (step S37). If it is determined that one of the modification command and the addition command has been input, the music content recording commander 101 notifies the attribute information recording setter 104 that the one of the modification command and the addition command has been input. In response to the one of the modification command and the addition command, the attribute information recording setter 104 modifies or adds data to the attribute information in response to the content of the modification command or the addition command input via the user interface 13 (step S38).

After the modification or the addition to the attribute information, or without the modification or the addition, the user operates the enter key meaning that the attribute information is acceptable to the user. The music content recording commander 101 detects the enter input of the attribute information (step S39), and commands the encoder 105 to receive the audio-video data from the audio-video data recording setter 103 and the attribute information from the attribute information recording setter 104. The music content recording commander 101 also commands the encoder 105 to encode the received information. In response to the command, the encoder 105 receives the audio-video data and the attribute information, and starts the encode process to store the resulting data onto the music content storage 20 (step S40).

The encoder 105 writes the encoded audio-video data onto the audio-video storage unit 21 while writing the encoded attribute information onto the attribute information storage unit 22 (step S41). The recording process then ends.

If it is determined in step S32 that the music content is not associated with the attribute information, the music content recording commander 101 issues a command to the attribute information recording setter 104 to generate and record attribute information of the music content (step S51 of FIG. 9).

The music content recording commander 101 also commands the music content data storage unit 102 to output the audio-video data of the music content to the audio-video data recording setter 103 and the music style analyzer 15 (step S52). In response to the command, the music content data storage unit 102 supplies the audio-video data of the music content together with the music content ID thereof to the audio-video data recording setter 103 while supplying the audio data of the music content to the music style analyzer 15.

Upon receiving the audio data from the music content data storage unit 102, the music style analyzer 15 analyzes the audio data, thereby extracting the tempo, the key, the chord, etc. on a per musical unit basis (step S53).

The attribute information recording setter 104 receives the notification from the music content recording commander 101 that the music content recording commander 101 generates the attribute information. The attribute information recording setter 104 determines whether the reproduction history information of the specified music piece is stored in the reproduction history information storage unit 17. If it is determined that the reproduction history information is stored in the reproduction history information storage unit 17, the attribute information recording setter 104 acquires the reproduction history information to be part of the attribute information (step S54). If it is determined that no reproduction history information is stored in the reproduction history information storage unit 17, the reproduction history information as the attribute information is set to be "null".

The attribute information recording setter 104 receives, from the user who has listened to the music piece input via the user interface 13, the numerical input (the 16-level number) of the feeling information of the input music piece. The music piece may be categorized according to the feeling categories of upbeat/downbeat music, forte/sweet music, and cheerful/mournful music. The feeling information is input as part of the attribute information (step S55).

The attribute information recording setter 104 acquires, from the music style analyzer 15, the music structure information analyzed and extracted by the music style analyzer 15, and sets as part of the attribute information (step S56). The attribute information recording setter 104 acquires the ambient environment information from the ambient environment information acquisition module 40 and sets the ambient environment information as part of the attribute information (step S57).

Based on the information acquired in steps S54 through S57, the attribute information recording setter 104 produces a tentative list of the attribute information to be recorded (step S58). The attribute information recording setter 104 then presents the produced attribute information tentative list to the user, for example, by displaying the tentative list on the display of the user interface 13 (step S36).

The user views the attribute information tentative list. If the user feels it necessary to perform a modification or an addition to the attribute information, the user modifies or adds information to the attribute information by performing a predetermined operation. After the modification or the addition, or if the user is satisfied with the attribute information as is, the user operates the enter key on the user interface 13 to enter the attribute information.

The music content recording commander 101 determines whether the user has issued the modification command to modify the attribute information or the addition command to add data to the attribute information (step S37). If it is determined that the user has issued the modification command or the addition command, the music content recording commander 101 so notifies the attribute information recording setter 104. Upon receiving the modification command or the addition command, the attribute information recording setter 104 modifies or adds information to the attribute information in response to the modification command or the addition command input via the user interface 13 (step S38).

After the modification process or the addition process of the attribute information, or with the attribute information neither any modification nor any addition applied thereto, the user operates the enter key to show that the attribute information is currently acceptable. The music content recording commander 101 detects the user's entered input about the attribute information (step S39). The music content recording commander 101 then commands the encoder 105 to receive the audio-video data from the audio-video data recording setter 103 and the attribute information from the attribute information recording setter 104, while also commanding the encoder 105 to encode the received information. In response to the command, the encoder 105 receives the audio-video data and the attribute information, and performs the encode process on the received data before storing the received data (step S40).

The encoder 105 writes the encoded audio-video data onto the audio-video storage unit 21 while writing the encoded attribute information onto the attribute information storage unit 22 (step S41). The recording process then ends.

In the above embodiment, the music style analyzer 15 extracts the music structure information if the music content is not associated with the music structure information of the attribute information. If the style of the music piece is already known by music score information or information about the producer, style analysis is not required. The user may input music structure information, such as the tempo, the key, and the chord based on the music score information, as the attribute information.

If the music structure information can be acquired via a network such as the Internet 2, the attribute information recording setter 104 acquires the music structure information via the music structure information acquisition unit 106, and handles as part of the attribute information.

In the recording and reproduction apparatus, the reproduction history information storage unit 17 stores past reproduction history of the user if the reproduction of music is repeated. A music piece frequently reproduced by the user is likely to be congenial to the user, and a music piece reproduced by the user for a short period of time is unlikely to be congenial to the user. Information about the frequency of reproductions and reproduction time of each music content is accumulated in an attribute area of the music content.

The reproduction history information stored on the attribute information storage unit 22 in the music content storage 20 as the attribute information is updated in response to not only the recording of the music content but also the reproduction of the music content when the reproduction history is updated in the reproduction history information storage unit 17.

If the frequency of reproductions of a music piece is high, the user is considered to show high preference to that music, and if the reproduction time of a music piece is short, the user is considered to show low preference to that music piece. The listener's preference to the music pieces is detected by referencing the reproduction history information. The style of the music piece resulting in a high preference seems to be congenial the user. Each time the frequency of reproductions and the reproduction time of each music piece are updated, the reproduction history information is updated in the attribute information storage unit 22. By referencing the reproduction history information and the music structure information in the attribute information, the music piece and the style thereof possibly favored by the listener are determined and used in the reorganization of the music piece during reproduction.

The reproduction process of the recording and reproduction apparatus is described below. In accordance with the present embodiment, the reproduction process has two features.

In one feature, in response to a user's reproduction start operation, the recording and reproduction apparatus successively selects and presents the music pieces the user is expected to favor. The user then selects a first music piece, and inputs a consecutive reproduction start command to the operation unit of the user interface 13. The recording and reproduction apparatus determines, based on the bio-information acquired from the listener, whether the user shows preference to the first selected music piece. If it is determined that the user shows preference, the recording and reproduction apparatus selects a music piece, similar to the first selected music piece, as a next reproduction music piece candidate.

The recording and reproduction apparatus determines the listener's preference in response to the motion of the head and the limbs, and the pulse rate of the listener who feels high, based on the bio-information of the listener.

If it is determined that the listener does not show preference to the music piece, the recording and reproduction apparatus selects a music piece considered to be favored by the listener based on the reproduction history information, for example. The recording and reproduction apparatus then selects a music piece, similar in style to the selected music piece, as a next reproduction music piece candidate. Alternatively, the recording and reproduction apparatus acquires the ambient environment information of the listener, and searches for a music piece matching the acquired ambient environment information by referencing the attribute information, and selects the hit music piece and a music piece similar in style to the hit music piece as a next reproduction music piece candidate.

Even when each of a second music piece and a subsequent music piece is played, the recording and reproduction apparatus constantly determines, based on the bio-information acquired from the listener as described above, whether the listener shows preference to the currently played music content. The next reproduction music piece candidate is thus updated. In accordance with the present embodiment, an updated reproduction music candidate is presented to the user on a real-time basis.

In known recording and reproduction apparatuses storing music data of several hundreds of music pieces in an internal memory, the music pieces are reproduced on a per album unit, in the order of recording, or in the random order determined by a random number. The order of reproduction is thus determined without paying attention to the user's preference.

In some known recording and reproduction apparatuses, a so-called play list (list of reproduction music piece candidates) is produced by a user, and the music pieces are played in the order of the produced list. In this case, it takes time to produce the play list. As the number of music pieces to be stored in an internal memory increases, the play list needs to be updated more frequently. In this known method, the user's preference is not actively taken into account.

In accordance with the present embodiment, the recording and reproduction apparatus references the past reproduction history information of user, the bio-information that is input from the user on a real-time basis, and the geographical information of the location of the recording and reproduction apparatus. The recording and reproduction apparatus then predicts the user's preference by matching the above information against the attribute information of the currently played music piece. As a result, the recording and reproduction apparatus provides a music piece the user is mostly likely to want to listen to in the current user's state of mind.

In the reproduction method of the music content, the attribute information of the music content, the bio-information of the listener, the reproduction history information and the ambient environment information are used. The recording and reproduction apparatus thus dynamically selects a music piece most appropriate to the user's preference, and reproduces and presents the selected music piece.

The recording and reproduction apparatus searches for a music piece having a chord progression and tempo close to a music piece used to be played in the past, from the attribute information of a large number of music pieces stored in the attribute information storage unit 22, and reproduces the found music piece. If bio-information indicating that the listener is relaxed as a result of listening to the currently played music piece is available, the recording and reproduction apparatus searches for a music piece similar in structure to that music piece, and reproduces the found music piece. In accordance with this embodiment, the recording and reproduction apparatus dynamically presents the music piece using the attribute information of the music contents.

In accordance with this embodiment, the attribute information contains the feeling information (of whether the music piece is upbeat or downbeat, for example), the reproduction history information of how many times the user has listened to the music, the information relating to the performer of the music piece and the music instruments used in the music piece, and the ambient environment information including the geographic information of where the music piece has been recorded and where the listening to the music piece is recommended. Using these pieces of information, a music piece more congenial to the user is extracted from a large number of music contents.

In the other feature of the reproduction process of the recording and reproduction apparatus of this embodiment, the recording and reproduction apparatus can reorganize the music piece by remixing or adding effect onto the currently played music piece on a per musical unit basis based on in particular the music structure information of the attribute information.

Depending of the mood of the listener, remixing may be performed as in disk jockey, in other words, a plurality of music pieces are concurrently played. The style of the music piece, such as the tempo and the keys, are modified. The currently played music piece is thus dynamically reorganized. To perform the dynamic reorganization, the music content data is associated with the attribute information, in particular, the music structure information. The music piece is reproduced and synthesized by dynamically reorganizing the music piece in a manner that matches the mood of the listener. The recording and reproduction apparatus thus provides the listener with a new manner of enjoying music.

As previously discussed, the attribute information is intended to reorganize and reproduce a music piece without destroying music expression. Music is typically delimited by measure, beat, etc., and a chord is attached to each measure. According to music theory, the style of music can be changed by combining different music element on a per measure basis without destroying music expression. Such a technique is referred to as a remixing technique typically used in disk jockey.

In accordance with this embodiment, the music structure information required to reorganize the music piece is recorded as the attribute information accompanying the audio-video data. More specifically, the music structure information contains the tempo, the key, the chord, the volume and the beat of the music piece on a per musical unit basis.

The reorganization process is not a perfunctory process. For example, the bio-information from the listener is fed back to the recording and reproduction apparatus, and the recording and reproduction apparatus dynamically keeps track of the listener's listening state, and dynamically monitors the ambient environment information of the location of the recording and reproduction apparatus. The recording and reproduction apparatus reorganizes the music piece into a music piece matching the environment surrounding the listener from the attribute information appropriate, and presents the resulting music piece to the listener.

In accordance with the present embodiment, the recording and reproduction apparatus reorganizes the music piece only when the listener shows preference to the music piece so that the listener likes more the music piece. Even if the listener shows no preference, the music piece is reorganized and then presented to the user to raise user's interest therein and preference thereto.

When the music piece is reorganized, the bio-information of the listener can be fed back to the recording and reproduction apparatus, the reproduction history information can be referenced, the ambient environment information can be referenced, a music piece to be remixed in the reorganization process can be selected, and a effect process can be selected. Recommended effect information, if available from the attribute information, can be used.

Figure 10:
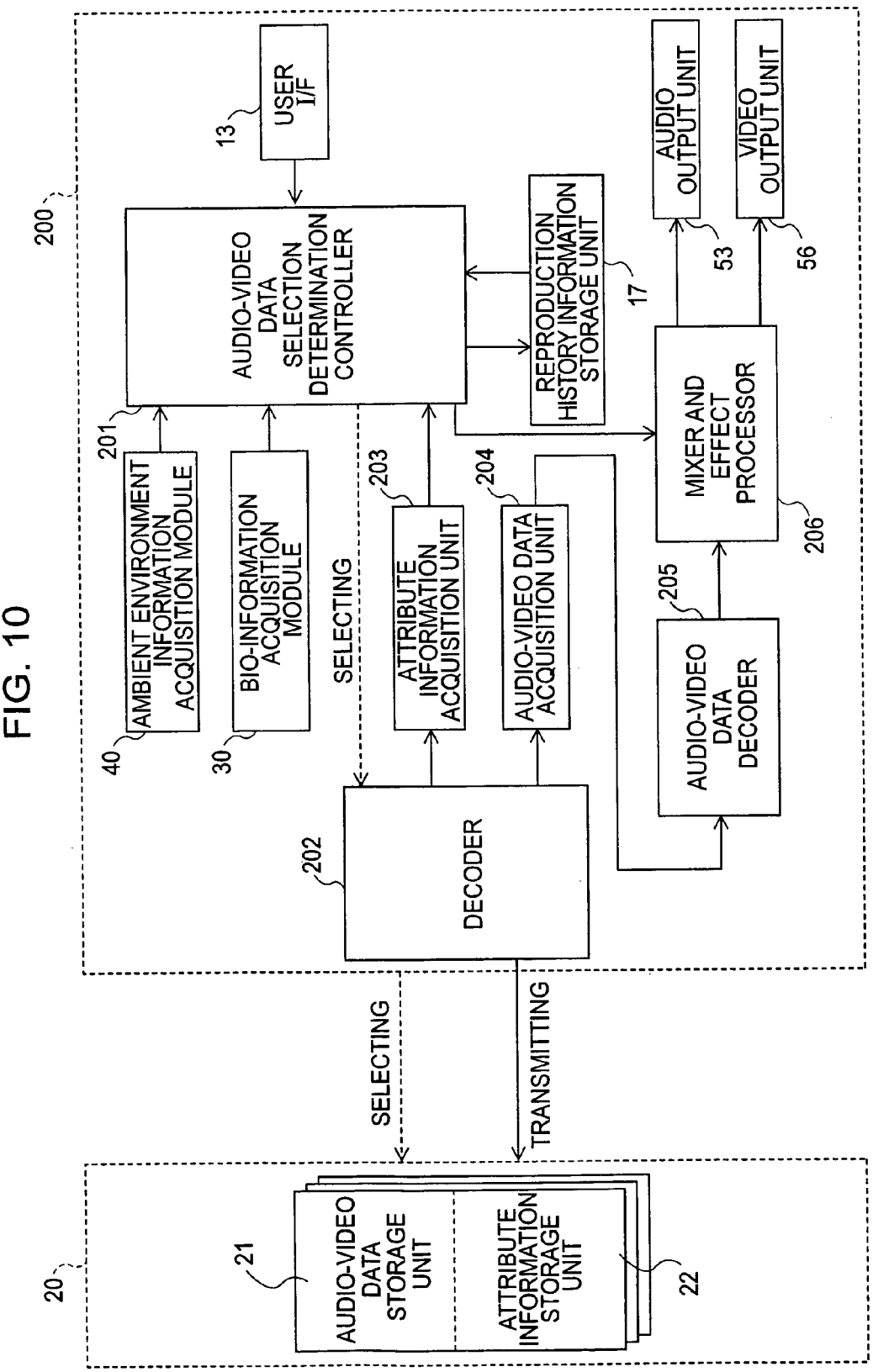
FIG. 10 is a functional block diagram illustrating a reproduction section of the recording and reproduction apparatus of FIG. 1.
Figure 11:
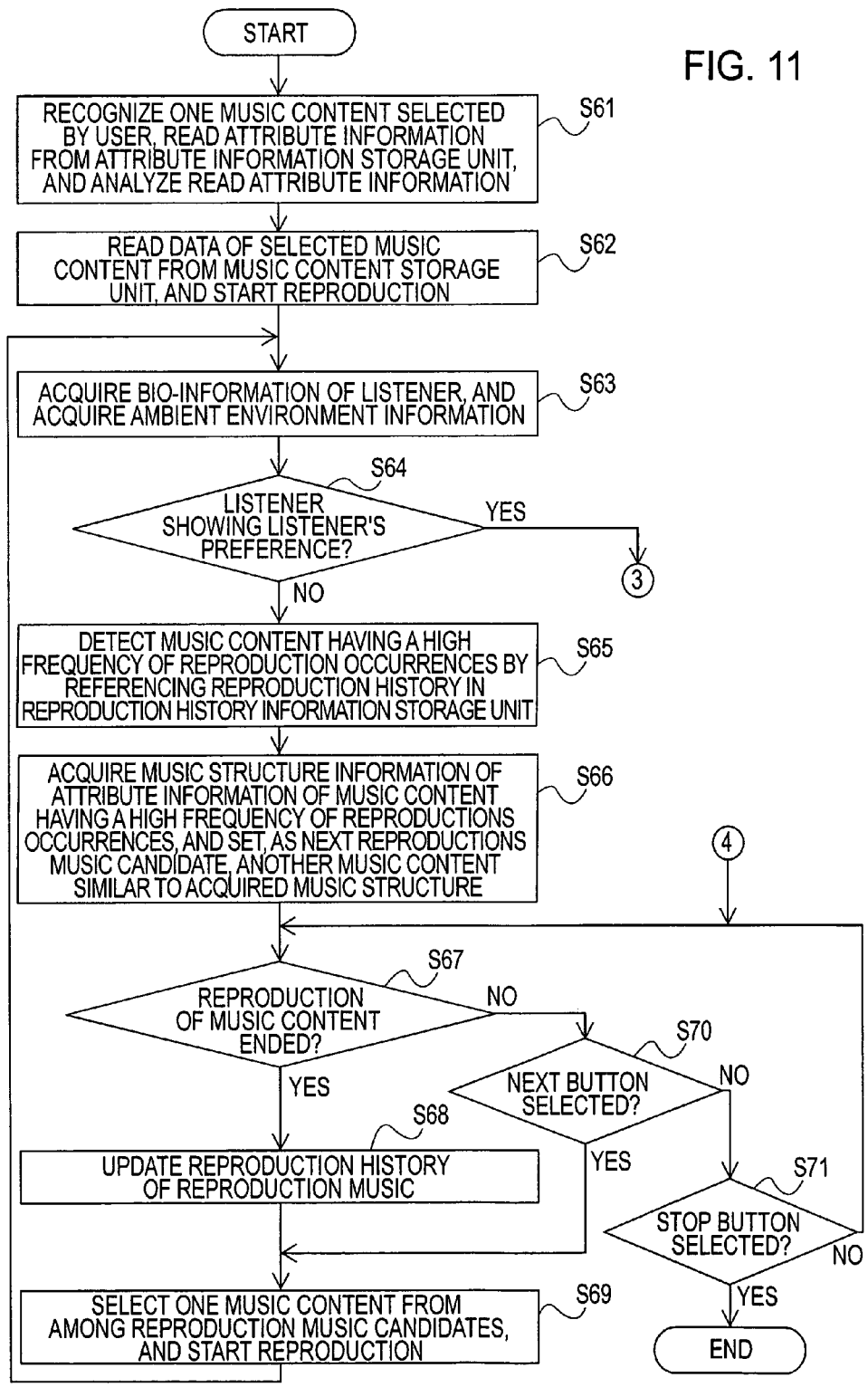
FIG. 11 is a flowchart illustrating the reproduction process of the recording and reproduction apparatus of FIG. 1.
Figure 12:
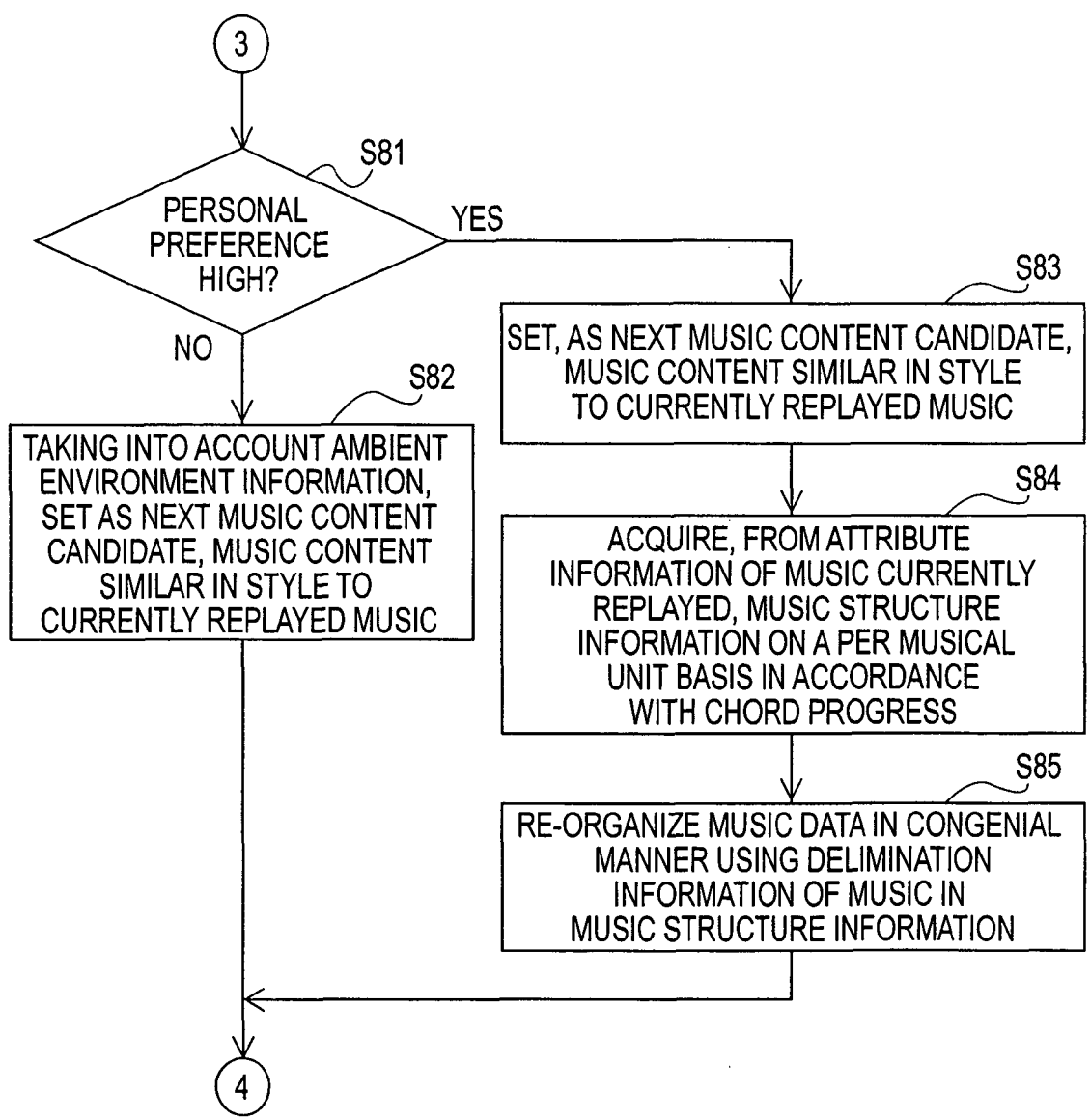
FIG. 12 is a continuation of the flowchart of FIG. 11.

The reproduction process is described in detail with reference to FIGS. 10 through 12. FIG. 10 is a functional block diagram illustrating a reproduction section of the recording and reproduction apparatus. FIGS. 11 and 12 are flowcharts of the reproduction process.

As shown in FIG. 10, the reproduction section of the recording and reproduction apparatus includes two major elements as the previously described recording section. One element is the music content storage 20 storing a plurality of music contents and the other element is a reproducer 200 reproducing a music content. The music content storage 20 has already been discussed. The reproducer 200 is discussed below.

As shown in FIG. 10, the reproducer 200 includes a user interface 13, a reproduction history information storage unit 17, a bio-information acquisition module 30, an ambient environment information acquisition module 40, an audio output unit 53, and a video output unit 56, and further includes, as functional processors, an audio-video data selection determination controller 201, a decoder 202, an attribute information acquisition unit 203, an audio-video data acquisition unit 204, an audio-video data decoder 205, and a mixer and effect processor 206.

In response to a user command input via the user interface 13, the audio-video data selection determination controller 201 selects a music content to be reproduced, and performs reproduction control. The audio-video data selection determination controller 201 thus corresponds to the CPU 10 that operates under the control of the recording program stored in the ROM 11 using the RAM 12 as a working area.

The decoder 202 acquires the audio-video data and the attribute information from the music content storage 20 in association with a content selection command from the audio-video data selection determination controller 201 in order to decompress compressed data. The decoder 202 thus corresponds to a decode portion of the encode/decode unit 14.

The decoder 202 transfers the attribute information, read from the music content storage 20 and decompressed, to the attribute information acquisition unit 203, and the audio-video data, read from the music content storage 20 and decompressed, to the audio-video data acquisition unit 204.

The attribute information acquisition unit 203 receives the decoded attribute information, read from the music content storage 20 and then decoded by the decoder 202, and supplies the attribute information to the audio-video data selection determination controller 201. The attribute information acquisition unit 203 is formed of a buffer as part of the RAM 12.

The audio-video data acquisition unit 204 receives, from the decoder 202, the decoded audio-video data, read from the music content storage 20 and decoded by the decoder 202. The audio-video data acquisition unit 204 then transfers the decoded audio-video data to the audio-video data decoder 205. The audio-video data acquisition unit 204 is formed of a buffer as part of the RAM 12.

The audio-video data decoder 205 includes the audio data decoder 51 and the video data decoder 54. The audio-video data decoder 205 decodes the audio data, and supplies the decoded audio data to the mixer and effect processor 206 while decoding the video data and supplying the decoded video data to the mixer and effect processor 206.

The mixer and effect processor 206 includes the audio arranging unit 52 and the video arranging unit 55. Upon receiving a control signal from the decoder 202, the mixer and effect processor 206 remixes audio data of another music piece with the decoded audio data, performs the effect process on the audio data, and changes the tempo, the key, and the chord progression. The effect process is also performed on the decoded video data.

The mixer and effect processor 206 supplies the audio output unit 53 with the remixed and effect-added audio data while supplying the video output unit 56 with the effect-added video data.

The listener bio-information acquired by the bio-information acquisition module 30 is supplied to the audio-video data selection determination controller 201 to be used in the selection of the music content and the reorganization of the music content. The ambient environment information, such as the location information about the location of the recording and reproduction apparatus, acquired by the ambient environment information acquisition module 40, is supplied to the audio-video data selection determination controller 201 for use in the selection and the reorganization of the music content.

In response to a read request supplied from the audio-video data selection determination controller 201, the reproduction history information storage unit 17 supplies the reproduction history information stored therewithin to the audio-video data selection determination controller 201. The audio-video data selection determination controller 201 uses the reproduction history information to select and reorganize the music piece.

The reproduction process is described below with reference to the flowcharts of FIGS. 11 and 12. The CPU 10 performs the process steps in FIGS. 11 and 12 using the RAM 12 as a working area under the control of the program stored in the ROM 11.

The user first selects a desired music content (music piece) on a music content selection screen of the display of the user interface 13, and commands the audio-video data selection determination controller 201 to reproduce the first music piece. The second and subsequent music pieces are automatically selected in the recording and reproduction apparatus.

Upon receiving the reproduction command of reproducing the first music piece via the user interface 13, the audio-video data selection determination controller 201 recognizes the requested music content. The audio-video data selection determination controller 201 commands the decoder 202 to read, from the attribute information storage unit 22 in the music content storage 20, the attribute information of the requested music content and all other attribute information or a predetermined amount of attribute information. The audio-video data selection determination controller 201 reads and analyzes the attribute information transferred from the decoder 202 via the attribute information acquisition unit 203 in response to the command (step S61).

In order to select a next reproduction music content candidate or reorganize the currently played music piece, the audio-video data selection determination controller 201 acquires and analyzes beforehand the attribute information of the requested music content and the attribute information of the other music contents. The audio-video data selection determination controller 201 thus prepares for the selection of the next reproduction music piece candidate and reorganization of the currently played music piece.

The audio-video data selection determination controller 201 commands the decoder 202 to read the audio-video data of the requested music content. The decoder 202 reads the audio-video data of the requested music content, and transfers the audio-video data to the audio-video data acquisition unit 204. The audio-video data acquired by the audio-video data acquisition unit 204 is then transferred to the audio-video data decoder 205 for decoding. The decoded audio-video data is supplied to the audio output unit 53 via the mixer and effect processor 206 for audio outputting while being supplied to the video output unit 56 for video outputting. The reproduction of the music content thus starts (step S62).

When the reproduction of the music content starts, the audio-video data selection determination controller 201 acquires the listener bio-information from the bio-information acquisition module 30, while acquiring the ambient environment information from the ambient environment information acquisition module 40 (step S63).

From the listener bio-information acquired from the bio-information acquisition module 30, the audio-video data selection determination controller 201 determines whether the listener shows preference to the currently played music (step S64).

The audio-video data selection determination controller 201 receives the bio-information relating to the motion of the body of the listener via the bio-information sensor 31 and the bio-information analyzer 32 in the recording and reproduction apparatus. The audio-video data selection determination controller 201 thus determines whether the listener positively desires to listen to the music piece. If the listener is impressed with the music piece, the listener naturally moves in synchronization with the music piece.

A correlation function between the music structure information of the currently reproduced music piece (such as the delimitation and the tempo of the musical unit) and the output signal of a motion sensor (such as an acceleration sensor) is calculated. Whether the listener positively desires to listen to the music is determined to some degree based on the correlation function. The feeling information in the attribute information is preferably accounted for in this case. If a music piece has a strong rhythm, the listener is likely to move strongly. If a music piece is sweet, the listener is likely to move slowly.

The higher the correlation value of the correlation function, the more positively the listener seems to hear the music piece, in other words, the more in-rhythm state the listener seems to shift in. If the listener positively hears the music piece, music pieces satisfying the user's preference may be presented by repeatedly producing a more rhythmic music piece.

If the listener moves slowly during listening, the brain wave may be stable. A quiet and less rhythmic music piece is reproduced at low volume. The user can thus enjoy comfortably the music piece.

The listener bio-information is analyzed referencing not only rhythm but also the feeling information contained in the attribute information of the currently reproduced music content, including "upbeat/downbeat", "sweet/forte", and "cheerful/mournful" feeling recognition numbers. For example, a sweet music piece or a mournful music piece is less rhythmic, but if the brain wave or the pulse rate of the listener is stable, the listener is considered to show preference.

If it is determined in step S64 that the listener does not show preference to the currently reproduced music piece, the audio-video data selection determination controller 201 references the reproduction history information in the reproduction history information storage unit 17 or the reproduction history information contained in the music piece of the attribute information in order to detect a music piece having a high frequency of reproductions (step S65).

The audio-video data selection determination controller 201 extracts the music structure information in the attribute information of the music piece having a high frequency of reproductions, and determines a music piece that is considered to be liked by the listener. If a plurality of music pieces having a high frequency of reproductions are available and have the same style, the audio-video data selection determination controller 201 determines that the listener likes the music pieces of that style. If a plurality of music pieces are available and are different in style, the audio-video data selection determination controller 201 determines that the listener likes one of the same music pieces having a high frequency of reproductions.

The audio-video data selection determination controller 201 selects another music piece having the music structure information similar to the music structure information of the music piece determined as being preferred by the listener, namely, another music piece similar in style to the music piece determined as being preferred by the listener, and selects the other music piece as a next reproduction music piece candidate (step S66). Since the listener currently shows no preference to the currently reproduced music piece, the recording and reproduction apparatus presents music pieces that are determined as being preferred by the listener from the past listener reproduction history.

The audio-video data selection determination controller 201 monitors whether the current music piece is reproduced to the end thereof (step S67). If it is determined that the current music piece is reproduced to the end thereof, the reproduction history of that music piece is updated in the reproduction history information storage unit 17. The reproduction history information in the attribute information of the corresponding music content is also updated (step S68).

The audio-video data selection determination controller 201 selects a music content to be reproduced next from the reproduction music pieces determined in step S66, issues a read command to read the audio-video data of that music content and starts the reproduction of the music content (step S69). Processing returns to step S63 to repeat step S63 and subsequent steps.

If it is determined in step S67 that the music piece is not yet reproduced to the end thereof, the audio-video data selection determination controller 201 determines whether a next button arranged in the operation unit in the user interface 13 is pressed (step S70). The next button is pressed to hear the next music piece rather the music piece currently heard by the listener.

If it is determined in step S70 that the next button is pressed, the audio-video data selection determination controller 201 proceeds to step S69. The audio-video data selection determination controller 201 selects the music content of a music piece to be reproduced next, from the reproduction music piece candidate determined in step S66, issues a read command to read the audio-video data of the music content and starts the reproduction of the music piece. Processing returns to step S63 to repeat step S63 and subsequent steps.

If it is determined in step S70 that the next button has not been pressed, the audio-video data selection determination controller 201 determines whether a stop button in the operation unit of the user interface 13 has been pressed by the user (step S71). If it is determined in step S71 that the stop button has not been pressed, processing returns to step S67 to monitor the end of the music piece. If it is determined that the stop button has been pressed, the reproduction process routine ends.

If it is determined in step S64 that the listener shows preference to the currently reproduced music piece, the audio-video data selection determination controller 201 determines, based on the degree of in-rhythm state or other information, whether the listener's preference is high (step S81 of FIG. 12).

If it is determined that the listener's preference is not so high, the audio-video data selection determination controller 201 examines the ambient environment information acquired from the ambient environment information acquisition module 40, and selects, as a next reproduction music piece candidate, a music piece similar in style to the currently reproduced music piece (step S82). For example, the audio-video data selection determination controller 201 selects another music piece having the music structure information as the attribute information similar to the music structure information of the attribute information accompanying the currently reproduced music piece. The audio-video data selection determination controller 201 acquires the information of the current geographic location acquired from the ambient environment information acquisition module 40, for example, information about a hill or the sea, and selects, as a next reproduction music piece candidate from the selected music pieces, a music piece containing, as the attribute information, the ambient environment information that recommends that the music piece be heard in that geographic location.

In step S82, a next reproduction music piece candidate may be determined based on the ambient environment information alone, rather than searching for a music piece similar in style to the currently reproduced music piece. Not only a music piece having ambient environment information matching the desired ambient environment information but also a music piece similar in music structure information to the currently reproduced music piece are determined as next reproduction music piece candidates.

If it is determined in step S81 that the listener's preference level is high, the audio-video data selection determination controller 201 selects, as a next reproduction music piece candidate, a music piece similar in style to the currently reproduced music piece (step S83). More specifically, another music piece having, as the attribute information, the music structure information similar to the music structure information of the attribute information associating with the currently reproduced music piece.

From the attribute information of the currently reproduced music piece, the audio-video data selection determination controller 201 acquires the delimitation information relating the musical unit, and the music structure information of the musical unit, such as the tempo, the key, and the chord progression (step S84). The audio-video data selection determination controller 201 reorganizes the audio data of the music piece in a manner free from discordance using the delimitation information of the musical unit and the music structure information of the musical unit (step S85). In step S85, effect can be added to the video data.

In the reorganization of the audio data, the remixing process and the effect process are performed, the tempo is made faster or slower, the key is raised or lowered, and the chord progression is changed.

In the remixing operation, a music piece having music structure information similar to the music structure information of the currently reproduced music piece is selected from other music pieces, and mixed with the original music piece in a manner free from discordance. During remixing, music data of the musical unit to be remixed may be determined referencing the feeling information in the attribute information.

The recording and reproduction apparatus may store beforehand the rhythm progress of a drum, or part of a percussion instrument. The rhythm process and the part of the percussion instrument may be remixed with the currently reproduced music piece following the delimitation of the musical unit.

The audio-video data selection determination controller 201 references the ambient environment information when selecting another music piece for remixing. The audio-video data selection determination controller 201 thus searches for a music piece adapted to the ambient environment by referencing the ambient environment information of the attribute information of that music piece.

If the attribute information of the currently reproduced music piece contains a recommended effect parameter, the effect process may be performed in a manner free from discordance using the effect parameter paying attention to the delimitation of the musical unit.

If the listener shows no preference to the currently reproduced music piece, the reproduction history information is acquires in step S65. In step S66, the next reproduction music piece candidate is determined based on the reproduction history information. Alternatively, in step S65, the ambient environment information acquired by the ambient environment information acquisition module 40 is analyzed to determine a geographic location, for example, a hill, the sea, and in step S66, a music piece having, as the attribute information, ambient environment information matching the ambient environment information of the geographic location may be selected as a next reproduction music piece. Not only a music piece having ambient environment information matching the desired ambient environment information but also a music piece similar in music structure information to the currently reproduced music piece are determined as next reproduction music piece candidates.

In step S66, the audio-video data selection determination controller 201 may determine a next reproduction music piece candidate using both the reproduction history information and the ambient environment information.

In the above discussion of the embodiments, the music content storage 20, including the hard disk drive, stores the audio-video data of the music content and the attribute information with the music content identification information associating the audio-video data with the attribute information. The music content storage 20 may include a DVD or an optical disk as a removable recording medium.

In the above discussion, the music content storage 20 causes the music content to be associated with the attribute information. The attribute information can be acquired over the Internet with a music content ID serving as a search key. In such a case, a server connected to the Internet serves as the attribute information storage unit 22.

The audio-video data of the music content is not necessarily stored together with the attribute information in a single storage. As long as information, such as the music content ID, associating the audio-video data with the attribute information is used, the audio-video data and the attribute information can be stored in separate storages.

The above-referenced embodiment is related to the recording and reproduction apparatus. The present invention is also applicable to a reproduction apparatus without recording function.

The reproduction process flow of FIGS. 11 and 12 are discussed for exemplary purposes only, and the present invention is not limited to that reproduction process flow.

The reorganization process is performed on the currently reproduced music piece by modifying the tempo or the key, remixing, or adding effect only if the listener shows high preference. Alternatively, regardless of preference, the currently reproduced music piece can be subjected to the reorganization process.

The data of the music content to be output in audio can be reorganized based on the reproduction history information acquired from the reproduction history information storage unit 17 and the music structure information of the attribute information of the music content to be reproduced. A music piece showing a high frequency of reproductions is detected in the past reproduction history. The data of the music piece having a high frequency of reproductions is added to the data of the currently reproduced music piece on a per musical unit basis in a manner free from discordance based on the music structure information of the attribute information of the music piece having the high frequency of reproductions and the music structure information of the attribute information of the currently reproduced music piece.

The data of the music content to be output in audio can be reorganized using the ambient environment information acquired by the ambient environment information acquisition module 40 and the attribute information of the music piece to be reproduced. For example, the ambient environment information about the sea, a hill, morning, noon, night, etc. is acquired. A music piece matching the ambient environment information is searched for with the ambient environment information as a search key, and the data of the music piece hit as a result of searching is remixed with the currently reproduced music piece in accordance with the limitation information of the attribute information thereof. The currently reproduced music piece is thus reorganized into a music piece matching the ambient environment.

In response to a reorganization request input via the user interface 13 by the user, the reorganization process can be performed using the music structure information of the attribute information in association with the music content. In such a case, the user may select one the remixing operation, the effect addition operation, the tempo modifying operation, the key modifying operation, and the chord modifying operation.

In accordance with the above-referenced embodiment, the music content is accompanied by the video data. The use of the video data is optional.

When the reproduction operation is started, a first music piece is specified by the user. Alternatively, the recording and reproduction apparatus can automatically select the first music piece based on the listener bio-information, the ambient environment information, or the reproduction history information.

From the listener bio-information, the recording and reproduction apparatus can determine whether the listener is in an excited state of mind or in a calmed state of mind, and can select a first music piece of style matching or opposed to the listener's state mine. The recording and reproduction apparatus determines from the effect information whether the current geographic location is at a hill, at sea, etc., and selects, as a first music piece to be reproduced, a music piece matching the geographic location by referencing the ambient environment information contained in the attribute information. The recording and reproduction apparatus can select, as a first music piece to be reproduced, a music piece determined as being frequently heard from the reproduction history.

It should be understood by those skilled in the art that various modifications, combinations, sub-combinations and alterations may occur depending on design requirements and other factors insofar as they are within the scope of the appended claims or the equivalents thereof.

What is claimed is:

1. An apparatus for reproducing music content, the apparatus comprising:
   first acquisition means for acquiring data of music content to be reproduced, from a music content data storage unit having stored a plurality of music contents;
   second acquisition means for acquiring attribute information from an attribute information storage unit, the attribute information being associated with the music content and containing at least music structure information of the music content on a per musical unit basis;
   reproducing means for reproducing, into an audio reproduction output, the music content data acquired by the first acquisition means;
   detecting means for detecting bio-information of a listener listening to the audio reproduction output; and
   setting means for setting a next reproduction music content candidate during reproduction of the music content, based, at least in part, on the acquired bio-information of the listener and the attribute information acquired by the second acquisition means.

2. The apparatus according to claim 1, further comprising:
   determining means for determining, based on the acquired bio-information of the listener detected by the detecting means, whether the listener shows preference to the music content currently being reproduced to the audio reproduction output,
   wherein if the determining means determines that the listener shows preference to the music content, the setting means searches, based on the attribute information acquired by the second acquisition means, for another music content having attribute information containing music structure information similar to the music structure information contained in the attribute information of the currently being reproduced music content to set the other music content as a next reproduction music content candidate.

3. The apparatus according to claim 2, further comprising:
   reproduction history information storage means for storing reproduction history information about music contents; and
   searching means for searching for a music content having a high frequency of reproductions by referencing the reproduction history information stored in the reproduction history information storage means if the listener shows no preference, wherein the setting means acquires, from the attribute information storage unit, attribute information of the music content having a high frequency of reproductions while setting, as a next reproduction music content candidate, a music content having attribute information containing music structure information similar to the music structure information contained in the acquired attribute information.

4. The apparatus according to claim 2, further comprising:
ambient environment information acquisition means for acquiring ambient environment information about the listener,
wherein the setting means sets a next reproduction music candidate if ambient environment information contained in the attribute information is similar to the ambient environment information acquired by the ambient environment information acquisition means.

5. An apparatus for reproducing music content, the apparatus comprising:
first acquisition means for acquiring data of music content to be reproduced, from a music content data storage unit having stored a plurality of music contents;
second acquisition means for acquiring attribute information from an attribute information storage unit, the attribute information being associated with the music content and containing at least music structure information of the music content on a per musical unit basis;
reproducing means for reproducing, into an audio reproduction output, the music content data acquired by the first acquisition means;
reproduction history information storage means for storing reproduction history information about music contents;
searching means for searching for a music content having a high frequency of reproductions by referencing the reproduction history information stored in the reproduction history information storage unit; and
setting means for acquiring, from the attribute information storage unit, attribute information of the music content having a high frequency of reproductions found by the searching means and setting, as a next reproduction music content candidate, a music content having attribute information containing music structure information similar the music structure information contained in the acquired attribute information.

6. The apparatus according to claim 5, further comprising:
ambient environment information acquisition means for acquiring ambient environment information,
wherein the setting means sets a next reproduction music candidate if ambient environment information contained in the attribute information is similar to the ambient environment information acquired by the ambient environment information acquisition means.

7. A method of reproducing music content, the method comprising:
acquiring data of first music content to be reproduced, from a music content data storage unit having stored a plurality of music contents;
acquiring attribute information from an attribute information storage unit, the attribute information being associated with the first music content and containing at least music structure information of the first music content;
reproducing the data of the first music content as an audio reproduction output;
detecting bio-information of a listener listening to the audio reproduction output; and
setting a next reproduction music content candidate during reproduction of the first music content based, at least in part, on the detected bio-information of the listener and the attribute information associated with the first music content.

8. The method according to claim 7, further comprising:
determining, based on the acquired bio-information of the listener, whether the listener shows preference to the music content currently being reproduced to the audio reproduction output; and
if the listener is determined as showing preference to the music content, searching, based on the attribute information, for second music content having attribute information containing music structure information similar to the music structure information contained in the attribute information associated with the first music content to set the second music content as a next reproduction music content candidate.

9. The method according to claim 8, further comprising:
searching for a music content having a high frequency of reproductions by referencing reproduction history information of music contents stored in a reproduction history information storage unit if the listener is determined as being showing no preference; and
acquiring, from the attribute information storage unit, attribute information of the music content having a high frequency of reproductions and setting, as a next reproduction music content candidate, a music content having attribute information containing music structure information similar the music structure information contained in the acquired attribute information.

10. The method according to claim 8, further comprising:
acquiring ambient environment information; and
setting a next reproduction music candidate if ambient environment information contained in the attribute information associated with the first music content is similar to the acquired ambient environment information.

11. A method of reproducing music content, the method comprising:
acquiring data of first music content to be reproduced, from a music content data storage unit having stored a plurality of music contents;
acquiring attribute information from an attribute information storage unit, the attribute information being associated with the first music content and containing at least music structure information of the first music content;
the data of the first music content;
searching for second music content having a high frequency of reproductions by referencing reproduction history information about music contents stored in a reproduction history information storage unit;
acquiring, from the attribute information storage unit, attribute information of the second music content; and
setting, as a next reproduction music content candidate, a music content having attribute information containing music structure information similar to the music structure information contained in the acquired attribute information.

12. The method according to claim 11, further comprising:
acquiring ambient environment information; and
setting the next reproduction music candidate if ambient environment information contained in the attribute information of the music contents stored in a recording medium is similar to the acquired ambient environment information.

13. An apparatus for reproducing music content, the apparatus comprising:
- first acquisition means for acquiring data of music content to be reproduced, from a music content data storage unit having stored a plurality of music contents;
- second acquisition means for acquiring attribute information from an attribute information storage unit, the attribute information being associated with the music content and containing at least music structure information of the music content on a per musical unit basis;
- reproducing means for reproducing, into an audio reproduction output, the music content data acquired by the first acquisition means;
- detecting means for detecting bio-information of a listener listening to the audio reproduction output; and
- reorganizing means for reorganizing data of the reproduction music content based on the detected bio-information of the listener and the attribute information acquired by the second acquisition means, wherein reorganizing the data comprises adding data of another music content or adding a sound effect to the reproduction music content on a per musical unit basis specified by the attribute information.

14. The apparatus according to claim 13, further comprising:
- ambient environment information acquisition means for acquiring ambient environment information of the listener,
- wherein the reorganizing means reorganizes the data of the reproduction music content based on the bio-information of the listener detected by the detecting means, the attribute information acquired by the second acquisition means, and the ambient environment information acquired by the ambient environment information acquisition means.

15. The apparatus according to claim 13, further comprising:
- reproduction history information storage means for storing reproduction history information about music contents,
- wherein the reorganizing means reorganizes the data of the reproduction music content based on the bio-information of the listener detected by the detecting means, the attribute information, and information about the reproduction history from the reproduction history information storage means.

16. The apparatus according to claim 13, wherein the reorganizing means comprises a unit for adding the data of another music content to current reproduction music content on a per musical unit basis.

17. The apparatus according to claim 13, wherein the reorganizing means adds the sound effect to current reproduction music content on a per musical unit basis.

18. An apparatus for reproducing music content, the apparatus comprising:
- first acquisition means for acquiring data of music content to be reproduced, from a music content data storage unit having stored a plurality of music contents;
- second acquisition means for acquiring attribute information from an attribute information storage unit, the attribute information being associated with the music content and containing at least music structure information of the music content on a per musical unit basis;
- reproducing means for reproducing, into an audio reproduction output, the music content data acquired by the first acquisition means;
- reproduction history information storage means for storing reproduction history information about music contents; and
- reorganizing means for reorganizing data of the reproduction music content based on the information of the reproduction history acquired from the reproduction history information storage means and the attribute information about the reproduction music content, wherein reorganizing the data comprises adding data of another music content or adding a sound effect to the reproduction music content on a per musical unit basis specified by the attribute information.

19. The apparatus according to claim 18, further comprising:
- ambient environment information acquisition means for acquiring ambient environment information,
- wherein the reorganizing means reorganizes the data of the reproduction music content based on the attribute information of the reproduction music content, the reproduction history information acquired from the reproduction history information storage means, and the ambient environment information acquired by the ambient environment information acquisition means.

20. The apparatus according to claim 18, wherein the reorganizing means comprises a unit for adding the data of another music content to the current reproduction music content on a per musical unit basis.

21. The apparatus according to claim 18, wherein the reorganizing means adds the sound effect to the current reproduction music content on a per musical unit basis.

22. An apparatus for reproducing music content, the apparatus comprising:
- first acquisition means for acquiring data of music content to be reproduced, from a music content data storage unit having stored a plurality of music contents;
- second acquisition means for acquiring attribute information from an attribute information storage unit, the attribute information being associated with the music content and containing at least music structure information of the music content on a per musical unit basis;
- reproducing means for reproducing, into an audio reproduction output, the music content data acquired by the first acquisition means;
- ambient environment information acquisition means for acquiring ambient environment information; and
- reorganizing means for reorganizing data of the reproduction music content based on the ambient environment information acquired by the ambient environment information acquisition means and the attribute information of the reproduction music content, wherein reorganizing the data comprises adding data of another music content or adding a sound effect to the reproduction music content on a per musical unit basis specified by the attribute information.

23. The apparatus according to claim 22, wherein the reorganizing means comprises a unit for adding the data of another music content to the current reproduction music content on a per musical unit basis.

24. The apparatus according to claim 22, wherein the reorganizing means adds the sound effect to the current reproduction music content on a per musical unit basis.

25. A method of reproducing music content, the method comprising:
- acquiring data of music content to be reproduced, from a music content data storage unit having stored a plurality of music contents;

acquiring attribute information from an attribute information storage unit, the attribute information being associated with the music content and containing at least music structure information of the music content on a per musical unit basis;
reproducing the data of the music content as an audio reproduction output;
detecting bio-information of a listener listening to the audio reproduction output; and
reorganizing the data of the reproduced music content based on the detected bio-information of the listener and the acquired attribute information, wherein reorganizing the data comprises adding data of another music content or adding a sound effect to the reproduction music content on a per musical unit basis specified by the attribute information.

26. A method of reproducing music content, the method comprising:
acquiring data of music content to be reproduced, from a music content data storage unit having stored a plurality of music contents;
acquiring attribute information from an attribute information storage unit, the attribute information being associated with the music content and containing at least music structure information of the music content on a per musical unit basis;
reproducing the music content data as an audio reproduction output; and
reorganizing the data of the reproduction music content based on reproduction history information acquired from a reproduction history information storage unit and the attribute information of the reproduction music content, wherein reorganizing the data comprises adding data of another music content or adding a sound effect to the reproduction music content on a per musical unit basis specified by the attribute information.

27. A method of reproducing music content, the method comprising:
acquiring data of music content to be reproduced, from a music content data storage unit having stored a plurality of music contents;
acquiring attribute information from an attribute information storage unit, the attribute information being associated with the music content and containing at least music structure information of the music content on a per musical unit basis;
reproducing the music content data as an audio reproduction output;
acquiring ambient environment information; and
reorganizing data of the reproduction music content based on the ambient environment information and the attribute information of the reproduction music content, wherein reorganizing the data comprises adding data of another music content or adding a sound effect to the reproduction music content on a per musical unit basis specified by the attribute information.

28. An apparatus for recording music content and attribute information thereof, the apparatus comprising:
music structure information acquisition means for acquiring, on a per musical unit basis, music structure information of music content to be recorded;
recording means for recording, onto a recording medium, data of the music content and attribute information associated with the data of the music content, the attribute information containing the music structure information acquired by the music structure information acquisition means; and
ambient environment information acquisition means for acquiring ambient environment information at a time of recording by the recording means.

29. The apparatus according to claim 28, further comprising:
reproduction history information acquisition means for acquiring reproduction history information about music contents,
wherein the recording means records the attribute information with the reproduction history information, acquired by the reproduction history information acquisition means, contained in the attribute information.

30. The apparatus according to claim 28, wherein the recording means records the attribute information with the ambient environment information, acquired by the ambient environment information acquisition means, contained in the attribute information.

31. An apparatus for recording music content and attribute information thereof, the apparatus comprising:
music structure information acquisition means for acquiring, on a per musical unit basis, music structure information of music content to be recorded;
reproduction history information acquisition means for acquiring reproduction history information about music contents;
ambient environment information acquisition means for acquiring ambient environment information at a time of recording;
input means for inputting music structure information other than the music structure information acquired by the music structure information acquisition means;
attribute information setting means for setting attribute information for use in reorganizing the music content in response to settings input by a user, based on the music structure information acquired by the music structure information acquisition means, the reproduction history information acquired by the reproduction history information acquisition means, the ambient environment information acquired by the ambient environment information acquisition means, and the other music structure information input by the input means; and
means for recording, onto a recording medium, data of the music content to be recorded, and the attribute information set by the attribute information setting means, the attribute information being associated with the data of the music content to be recorded.

32. An apparatus for reproducing music content, the apparatus comprising:
a first acquisition unit acquiring data of music content to be reproduced, from a music content data storage unit having stored a plurality of music contents;
a second acquisition unit acquiring attribute information from an attribute information storage unit, the attribute information being associated with the music content and containing at least music structure information of the music content on a per musical unit basis;
a reproducing unit reproducing, into an audio reproduction output, the music content data acquired by the first acquisition unit;
a detecting unit detecting bio-information of a listener listening to the audio reproduction output; and
a setting unit setting a next reproduction music content candidate during reproduction of the music content, based, at least in part, on the acquired bio-information of the listener and the attribute information acquired by the second acquisition unit.

33. An apparatus for reproducing music content, the apparatus comprising:
- a first acquisition unit acquiring data of music content to be reproduced, from a music content data storage unit having stored a plurality of music contents;
- a second acquisition unit acquiring attribute information from an attribute information storage unit, the attribute information being associated with the music content and containing at least music structure information of the music content on a per musical unit basis;
- a reproducing unit reproducing, into an audio reproduction output, the music content data acquired by the first acquisition unit;
- a reproduction history information storage unit storing reproduction history information about music contents;
- a searching unit searching for a music content having a high frequency of reproductions by referencing the reproduction history information stored in the reproduction history information storage unit; and
- a setting unit acquiring, from the attribute information storage unit, attribute information of the music content, having a high frequency of reproductions, found by the searching unit and setting, as a next reproduction music content candidate, a music content having attribute information containing music structure information similar to the music structure information contained in the acquired attribute information.

34. An apparatus for reproducing music content, the apparatus comprising:
- a first acquisition unit acquiring data of music content to be reproduced, from a music content data storage unit having stored a plurality of music contents;
- a second acquisition unit acquiring attribute information from an attribute information storage unit, the attribute information being associated with the music content and containing at least music structure information of the music content on a per musical unit basis;
- a reproducing unit reproducing, into a audio reproduction output, the music content data acquired by the first acquisition unit;
- a detecting unit detecting bio-information of a listener listening to the audio reproduction output; and
- a reorganizing unit reorganizing the data of the reproduction music content based on the detected bio-information of the listener and the attribute information acquired by the second acquisition unit, wherein reorganizing the data comprises adding data of another music content or adding a sound effect to the reproduction music content on a per musical unit basis specified by the attribute information.

35. An apparatus for reproducing music content, the apparatus comprising:
- a first acquisition unit acquiring data of music content to be reproduced, from a music content data storage unit having stored a plurality of music contents;
- a second acquisition unit acquiring attribute information from an attribute information storage unit, the attribute information being associated with the music content and containing at least music structure information of the music content on a per musical unit basis;
- a reproducing unit reproducing, into an audio reproduction output, the music content data acquired by the first acquisition unit;
- a reproduction history information storage unit storing reproduction history information about music contents; and
- a reorganizing unit reorganizing data of the reproduction music content based on the reproduction history information acquired from the reproduction history information storage unit and the attribute information about the reproduction music content.

36. An apparatus for reproducing music content, the apparatus comprising:
- a first acquisition unit acquiring data of music content to be reproduced, from a music content data storage unit having stored a plurality of music contents;
- a second acquisition unit acquiring attribute information from an attribute information storage unit, the attribute information being associated with the music content and containing at least music structure information of the music content on a per musical unit basis;
- a reproducing unit reproducing, into an audio reproduction output, the music content data acquired by the first acquisition unit;
- an ambient environment information acquisition unit acquiring ambient environment information; and
- a reorganizing unit reorganizing data of the reproduction music content based on the ambient environment information acquired by the ambient environment information acquisition unit and the attribute information of the reproduction music content, wherein reorganizing the data comprises adding data of another music content or adding a sound effect to the reproduction music content on a per musical unit basis specified by the attribute information.

37. An apparatus for recording music content and attribute information thereof, the apparatus comprising:
- a music structure information acquisition unit acquiring, on a per musical unit basis, music structure information of music content to be recorded;
- a recording unit recording, onto a recording medium, the data of the music content and attribute information in association with data of the music content, the attribute information containing the music structure information acquired by the music structure information acquisition unit; and
- an ambient environment information acquisition unit acquiring ambient environment information at the time of recording by the recording unit.

38. An apparatus for recording music content and attribute information thereof, the apparatus comprising:
- a music structure information acquisition unit acquiring, on a per musical unit basis, music structure information of music content to be recorded;
- a reproduction history information acquisition unit acquiring reproduction history information about music contents;
- an ambient environment information acquisition unit acquiring ambient environment information at the time of recording;
- an input unit inputting music structure information other than the music structure information acquired by the music structure information acquisition unit;
- an attribute information setting unit setting attribute information for use in reorganizing the music content in response to settings input by a user, based on the music structure information acquired by the music structure information acquisition unit, the information of the reproduction history acquired by the reproduction history information acquisition unit, the ambient environment information acquired by the ambient environment information acquisition unit, and the other music structure information input by the input unit; and
- a unit recording, onto a recording medium, data of the music content to be recorded, and the attribute information set by the attribute information setting unit, the attribute information being associated with the data of the music content to be recorded.

* * * * *